US012542106B2

(12) United States Patent
Yuan et al.

(10) Patent No.: US 12,542,106 B2
(45) Date of Patent: Feb. 3, 2026

(54) PIXEL CIRCUIT, PIXEL DRIVING METHOD AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Changlong Yuan, Beijing (CN); Zhenhua Zhang, Beijing (CN); Jingyi Feng, Beijing (CN); Li Zhu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 68 days.

(21) Appl. No.: 18/558,487

(22) PCT Filed: Jan. 30, 2023

(86) PCT No.: PCT/CN2023/073816
§ 371 (c)(1),
(2) Date: Nov. 1, 2023

(87) PCT Pub. No.: WO2024/159352
PCT Pub. Date: Aug. 8, 2024

(65) Prior Publication Data
US 2025/0104641 A1 Mar. 27, 2025

(51) Int. Cl.
*G09G 3/3258* (2016.01)

(52) U.S. Cl.
CPC ... *G09G 3/3258* (2013.01); *G09G 2300/0852* (2013.01); *G09G 2310/061* (2013.01); *G09G 2320/0233* (2013.01)

(58) Field of Classification Search
CPC .................. G09G 3/3233; G09G 3/32; G09G 2300/0819; G09G 2300/0861;
(Continued)

(56) References Cited

U.S. PATENT DOCUMENTS 10,192,486 B2 * 1/2019 He ....................... G09G 3/3258
11,322,087 B1 * 5/2022 Beard .................. G09G 3/3233
(Continued)

FOREIGN PATENT DOCUMENTS

CN 101908316 A 12/2010
CN 103413520 A 11/2013
(Continued)

*Primary Examiner* — Olga V Merkoulova
(74) *Attorney, Agent, or Firm* — BROOKS KUSHMAN P.C.

(57) ABSTRACT

A pixel circuit, a pixel driving method and a display device. The pixel circuit includes a light-emitting element, a driving circuit, a first energy storage circuit, a second energy storage circuit, a data writing circuit, and a compensation control circuit. The data writing circuit controls writing of a data voltage on a data line into a data writing node under control of a scanning signal. The compensation control circuit controls whether a second node is connected with or disconnected from a compensation node under control of a first reset signal. The compensation node is electrically connected to a third node, and/or, the compensation node is electrically connected to a second terminal of the driving circuit. The present disclosure can achieve high-frequency driving under the premise of sufficient compensating for the threshold voltage of the driving transistor included in the driving circuit.

20 Claims, 20 Drawing Sheets

(58) Field of Classification Search
CPC ... G09G 2310/0251; G09G 2300/0852; G09G 2330/02; G09G 2320/0233
See application file for complete search history.

(56) References Cited

U.S. PATENT DOCUMENTS

| | | | | |
|---|---|---|---|---|
| 11,847,969 | B2 * | 12/2023 | Wu | G09G 3/2011 |
| 2006/0038757 | A1 | 2/2006 | Lee | |
| 2010/0309187 | A1 | 12/2010 | Kang | |
| 2015/0154906 | A1 * | 6/2015 | Chung | G09G 3/3233 345/212 |
| 2015/0213761 | A1 | 7/2015 | Chen | |
| 2015/0302798 | A1 | 10/2015 | Tan | |
| 2018/0096653 | A1 * | 4/2018 | He | G09G 3/3258 |
| 2021/0005138 | A1 * | 1/2021 | Umezawa | G09G 3/3233 |
| 2021/0210013 | A1 * | 7/2021 | Lin | G09G 3/3233 |
| 2022/0101777 | A1 | 3/2022 | Kim et al. | |
| 2022/0293038 | A1 | 9/2022 | Zhao et al. | |

FOREIGN PATENT DOCUMENTS

| | | | |
|---|---|---|---|
| CN | 103474025 | A | 12/2013 |
| CN | 103778889 | A | 5/2014 |
| CN | 105489163 | A | 4/2016 |
| CN | 205282056 | U | 6/2016 |
| CN | 113053297 | A | 6/2021 |
| CN | 114255708 | A | 3/2022 |
| CN | 115083335 | A | 9/2022 |

* cited by examiner

PIXEL CIRCUIT, PIXEL DRIVING METHOD AND DISPLAY DEVICE

CROSS-REFERENCE TO RELATED APPLICATION

This application is the U.S. national phase of PCT Application No. PCT/CN2023/073816 filed on Jan. 30, 2023, which is incorporated herein by reference in its entirety.

TECHNICAL FIELD

The present disclosure relates to the field of display technologies, in particular to a pixel circuit, a pixel driving method and a display device.

BACKGROUND

In the related art, a pixel circuit cannot achieve high-frequency driving under the premise of sufficient compensating for a threshold voltage of a driving transistor included in the driving circuit.

SUMMARY

In a first aspect, an embodiment of the present disclosure provides a pixel circuit, including a light-emitting element, a driving circuit, a first energy storage circuit, a second energy storage circuit, a data writing circuit, and a compensation control circuit;

wherein a first terminal of the first energy storage circuit is electrically connected to a first node, and a second terminal of the first energy storage circuit is electrically connected to a second node; the first energy storage circuit is configured to store electrical energy;

a first terminal of the second energy storage circuit is electrically connected to the second node, and a second terminal of the second energy storage circuit is electrically connected to a third node; the second energy storage circuit is configured to store electrical energy;

a control terminal of the driving circuit is electrically connected to the first node;

the driving circuit is configured to, under control of a potential at the control terminal of the driving circuit, drive the light-emitting element;

the third node is electrically connected to a first electrode of the light-emitting element, and a second electrode of the light-emitting element is electrically connected to a first voltage terminal;

the data writing circuit is electrically connected to a scanning line, a data line, and a data writing node, respectively; the data writing circuit is configured to, under control of a scanning signal provided by the scanning line, control writing of a data voltage on the data line into the data writing node;

the compensation control circuit is electrically connected to a first reset terminal, the second node and a compensation node, respectively; the compensation control circuit is configured to, under control of a first reset signal, control whether the second node is connected with or disconnected from the compensation node;

the compensation node is electrically connected to the third node, and/or, the compensation node is electrically connected to a second terminal of the driving circuit; the data writing node is the second node or the third node.

Optionally, the pixel circuit further includes a first reset circuit and a second reset circuit;

wherein the first reset circuit is electrically connected to the first reset terminal, a reference voltage terminal and the first node, respectively; the first reset circuit is configured to, under control of the first reset signal provided by the first reset terminal, write a reference voltage provided by the reference voltage terminal into the first node;

the second reset circuit is electrically connected to a second reset terminal, a first initial voltage terminal and a reset node, respectively; the second reset circuit is configured to, under control of a second reset signal provided by the second reset terminal, write a first initial voltage provided by the first initial voltage terminal into the reset node;

the reset node is the second node or the third node.

Optionally, the pixel circuit further includes a third reset circuit;

wherein the third reset circuit is electrically connected to the scanning line, a second initial voltage terminal and the reset node, respectively; the third reset circuit is configured to, under control of the scanning signal provided by the scanning line, write a second initial voltage provided by the second initial voltage terminal into the reset node;

the data writing node is the second node, and the reset node is the third node; or, the data writing node is the third node, and the reset node is the second node.

Optionally, the pixel circuit further includes a first light-emitting control circuit;

wherein a first terminal of the driving circuit is electrically connected to a power supply voltage terminal through the first light-emitting control circuit; the second terminal of the driving circuit is electrically connected to the first electrode of the light-emitting element;

a control terminal of the first light-emitting control circuit is electrically connected to a light-emitting control line; the first light-emitting control circuit is configured to, under control of a light-emitting control signal provided by the light-emitting control line, control whether the power supply voltage terminal is connected with or disconnected from the first terminal of the driving circuit.

Optionally, the pixel circuit further includes a second light-emitting control circuit;

wherein a first terminal of the driving circuit is electrically connected to a power supply voltage terminal, and the second terminal of the driving circuit is electrically connected to the first electrode of the light-emitting element through the second light-emitting control circuit;

a control terminal of the second light-emitting control circuit is electrically connected to a light-emitting control line; the second light-emitting control circuit is configured to, under control of a light-emitting control signal provided by the light-emitting control line, control whether the second terminal of the driving circuit is connected with or disconnected from the first electrode of the light-emitting element.

Optionally, the data writing circuit includes a first transistor, and the compensation control circuit includes a second transistor;

a gate electrode of the first transistor is electrically connected to the scanning line, a first electrode of the first transistor is electrically connected to the data line, and a second electrode of the first transistor is electrically connected to the data writing node;

a gate electrode of the second transistor is electrically connected to the first reset terminal, a first electrode of the second transistor is electrically connected to the second node, and a second electrode of the second transistor is electrically connected to the compensation node.

Optionally, the driving circuit includes a driving transistor, the first reset circuit includes a third transistor, and the second reset circuit includes a fourth transistor;

a gate electrode of the driving transistor is electrically connected to the first node, a first electrode of the driving transistor is electrically connected to the first terminal of the driving circuit, and a second electrode of the driving transistor is electrically connected to the second terminal of the driving circuit;

a gate electrode of the third transistor is electrically connected to the first reset terminal, a first electrode of the third transistor is electrically connected to the reference voltage terminal, and a second electrode of the third transistor is electrically connected to the first node;

a gate electrode of the fourth transistor is electrically connected to the second reset terminal, a first electrode of the fourth transistor is electrically connected to the first initial voltage terminal, and a second electrode of the fourth transistor is electrically connected to the reset node.

Optionally, the first energy storage circuit includes a first capacitor, and the second energy storage circuit includes a second capacitor;

a first terminal of the first capacitor is electrically connected to the first node, and a second terminal of the first capacitor is electrically connected to the second node;

a first terminal of the second capacitor is electrically connected to the second node, and a second terminal of the second capacitor is electrically connected to the third node.

Optionally, the third reset circuit includes a fifth transistor;

a gate electrode of the fifth transistor is electrically connected to the scanning line, a first electrode of the fifth transistor is electrically connected to the second initial voltage terminal, and a second electrode of the fifth transistor is electrically connected to the reset node.

Optionally, the first light-emitting control circuit includes a sixth transistor;

a gate electrode of the sixth transistor is electrically connected to the light-emitting control line, a first electrode of the sixth transistor is electrically connected to the power supply voltage terminal, and a second electrode of the sixth transistor is electrically connected to the first terminal of the driving circuit.

Optionally, the second light-emitting control circuit includes a seventh transistor;

a gate electrode of the seventh transistor is electrically connected to the light-emitting control line, a first electrode of the seventh transistor is electrically connected to the second terminal of the driving circuit, and a second electrode of the seventh transistor is electrically connected to the first electrode of the light-emitting element.

In a second aspect, an embodiment of the present disclosure provides a pixel driving method applied to the foregoing pixel circuit, including: for a display period including a compensation phase, a writing phase and a light-emitting phase which are set in sequence, in the compensation phase, controlling, by the compensation control circuit under control of a first reset signal, the second node to be connected with the compensation node;

at starting of the compensation phase, controlling, by the driving circuit under control of a potential at the control terminal of the driving circuit, the first terminal of the driving circuit to be connected with the second terminal of the driving circuit to charge the first energy storage circuit and the second energy storage circuit through the power supply voltage terminal, until the driving circuit, under control of the potential at the control terminal of the driving circuit, controls the first terminal of the driving circuit to be disconnected from the second terminal of the driving circuit;

in the writing phase, writing, by the data writing circuit under control of a scanning signal, a data voltage on the data line into the data writing node, and controlling, by the compensation control circuit under control of the first reset signal, the second node to be disconnected from the compensation node;

in the light-emitting phase, driving, by the driving circuit, the light-emitting element.

Optionally, the display period further includes a reset phase set before the compensation phase; the pixel driving method further includes:

in the reset phase and the compensation phase, writing, by the first reset circuit under control of the first reset signal, a reference voltage into the first node;

in the reset phase, writing, by the second reset circuit under control of a second reset signal, a first initial voltage into the reset node.

Optionally, the pixel circuit further includes:

in the reset phase, controlling, by the compensation control circuit under control of the first reset signal, the second node to be connected with the compensation node.

Optionally, the pixel driving method includes:

in the writing phase, writing, by the second reset circuit under control of the second reset signal, the first initial voltage into the reset node.

Optionally, the pixel circuit further includes a third reset circuit; the pixel driving method further includes:

in the writing phase, writing, by the third reset circuit under control of the scanning signal, a second initial voltage into the reset node.

Optionally, the pixel circuit further includes a first light-emitting control circuit; the pixel driving method further includes:

in the compensation phase and the light-emitting phase, controlling, by the first light control circuit under control of a light-emitting control signal, the power supply voltage terminal to be connected with the first terminal of the driving circuit.

Optionally, the pixel circuit further includes a second light-emitting control circuit; the pixel driving method further includes:

in the compensation phase and the light-emitting phase, controlling, by the second light control circuit under control of the light control signal, the second terminal of the driving circuit to be connected with the first electrode of the light-emitting element.

In a third aspect, an embodiment of the present disclosure provides a display device, including the foregoing pixel circuit.

DETAILED DESCRIPTION

Figure 1:
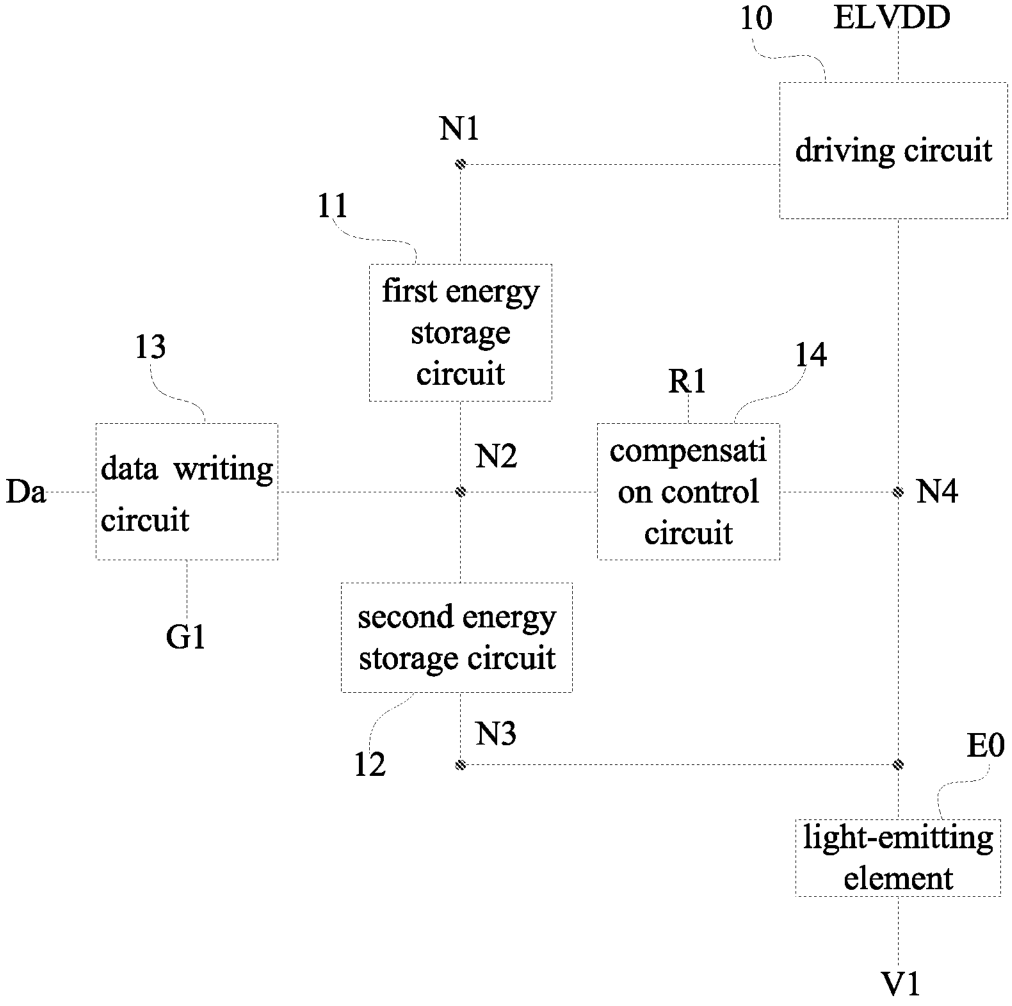
FIG. 1 is a schematic diagram of a pixel circuit according to at least one embodiment of the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

Transistors used in all the embodiments of the present disclosure may be thin film transistors, field effect transistors or other devices with the same characteristics. In the embodiments of the present disclosure, in order to distinguish two electrodes of one transistor other than a gate electrode, one of the two electrodes is referred to as a first electrode, and the other electrode is referred to as a second electrode.

In actual operation, when the transistor is a thin film transistor or a field effect transistor, the first electrode may be a drain electrode, and the second electrode may be a source electrode, or the first electrode may be a source electrode, and the second electrode may be a drain electrode.

A pixel circuit according to one embodiment of the present disclosure includes: a light-emitting element, a driving circuit, a first energy storage circuit, a second energy storage circuit, a data writing circuit, and a compensation control circuit.

A first terminal of the first energy storage circuit is electrically connected to a first node, and a second terminal of the first energy storage circuit is electrically connected to a second node. The first energy storage circuit is used to store electrical energy.

A first terminal of the second energy storage circuit is electrically connected to the second node, and a second terminal of the second energy storage circuit is electrically connected to a third node. The second energy storage circuit is used to store electrical energy.

A control terminal of the driving circuit is electrically connected to the first node. The driving circuit is used to, under control of a potential at the control terminal of the driving circuit, drive the light-emitting element.

The third node is electrically connected to a first electrode of the light-emitting element. A second electrode of the light-emitting element is electrically connected to a first voltage terminal.

The data writing circuit is electrically connected to a scanning line, a data line, and a data writing node respectively, and is used to, under control of a scanning signal provided by the scanning line, control writing of a data voltage on the data line into the second node.

The compensation control circuit is electrically connected to a first reset terminal, the second node, and a compensation node respectively, and is used to, under control of the first reset signal, control whether the second node and the compensation node are connected or disconnected.

The compensation node is electrically connected to the third node, and/or, the compensation node is electrically connected to a second terminal of the driving circuit. The data writing node is the second node or the third node.

The pixel circuit according to the embodiment of the present disclosure performs threshold voltage compensation and data voltage writing in a time-division manner during operation, in order to achieve high-frequency driving under the premise of sufficient compensating for the threshold voltage.

In at least one embodiment of the present disclosure, since the threshold voltage compensation and the data voltage writing are performed in a time-division manner, the threshold voltage compensation can be performed for a long period of time, so that the threshold voltage of the driving transistor included in the driving circuit can be sufficiently compensated, and a frequency of the scanning signal provided by the scanning line can be increased, thereby achieving high-frequency driving.

In at least one embodiment of the present disclosure, a first terminal of the driving circuit may be electrically connected to a power supply voltage terminal; a second terminal of the driving circuit may be electrically connected to the first electrode of the light-emitting element; or, the first terminal of the driving circuit may be electrically connected to the power supply voltage terminal through the first light-emitting control circuit; the second terminal of the driving circuit may be electrically connected to the first electrode of the light-emitting element; or, the first terminal of the driving circuit may be electrically connected to the power supply voltage terminal, the second terminal of the driving circuit may be electrically connected to the first electrode of the light-emitting element through the second light-emitting control circuit; or, the first terminal of the driving circuit may be electrically connected to the power supply voltage terminal through the first light-emitting control circuit; the second terminal of the driving circuit may be electrically connected to the first electrode of the light-emitting element through the second light-emitting control circuit;

The present disclosure is not limited to the above.

As shown in FIG. 1, a pixel circuit according to at least one embodiment of the present disclosure includes: a light-emitting element E0, a driving circuit 10, a first energy storage circuit 11, a second energy storage circuit 12, a data writing circuit 13, and a compensation control circuit 14.

A first terminal of the first energy storage circuit 11 is electrically connected to a first node N1; and a second terminal of the first energy storage circuit 11 is electrically connected to a second node N2. The first energy storage circuit 11 is used to store electrical energy.

A first terminal of the second energy storage circuit 12 is electrically connected to the second node N2; and a second terminal of the second energy storage circuit 12 is electrically connected to a third node. The second energy storage circuit is used to store electrical energy.

A control terminal of the driving circuit 10 is electrically connected to the first node N1; a first terminal of the driving circuit 10 is electrically connected to a power supply voltage terminal ELVDD; and a second terminal of the driving circuit 10 is electrically connected to a first electrode of the light-emitting element E0. The driving circuit 10 is used to, under control of a potential at the control terminal of the driving circuit 10, drive the light-emitting element E0.

A second electrode of the light-emitting element E0 is electrically connected to a first voltage terminal V1. The third node N3 is electrically connected to the first electrode of the light-emitting element E0.

The data writing circuit 13 is electrically connected to a scanning line G1, a data line Da, and the second node N2 respectively, and is used to, under control of a scanning signal provided by the scanning line G1, control writing of a data voltage Vdata on the data line Da into the second node N2.

The compensation control circuit 14 is electrically connected to a first reset terminal R1, the second node N2, and a compensation node N4 respectively, and is used to, under control of the first reset signal, control whether the second node N2 and the compensation node N4 are connected or disconnected.

The compensation node N4 is electrically connected to the third node N3.

In at least one embodiment shown in FIG. 1, the data writing node is the second node N2.

Optionally, the first voltage line may be a low voltage line, which is not limited thereto.

When at least one embodiment of the pixel circuit shown in FIG. 1 of the present disclosure is in operation, a display period includes a compensation phase, a writing phase, and a light-emitting phase which are set in sequence.

In the compensation phase, the compensation control circuit 14 controls the second node N2 to be connected with the compensation node N4, under control of a first reset signal.

At starting of the compensation phase, under control of a potential at the control terminal of the driving circuit 10, the driving circuit 10 controls the first terminal of the driving circuit 10 to be connected with the second terminal of the driving circuit 10, thereby charging the first energy storage circuit 11 and the second energy storage circuit 12 through the power supply voltage terminal, until the driving circuit 10, under control of the potential at the control terminal of the driving circuit 10, controls the first terminal of the driving circuit 10 to be disconnected from the second terminal of the driving circuit 10.

In the writing phase, under control of a scanning signal, the data writing circuit 13 writes a data voltage Vdata on the data line Da into the second node N2; and, under control of the first reset signal, the compensation control circuit 14 controls the second node N2 to be disconnected from the compensation node N4.

In the light-emitting phase, the driving circuit 10 drives the light-emitting element E0.

When at least one embodiment of the pixel circuit shown in FIG. 1 of the present disclosure is in operation, threshold voltage compensation is performed during the compensation phase, and data voltage writing is performed during the writing phase, so that the threshold voltage compensation and the data voltage writing are performed in a time-division manner, thereby achieving high-frequency driving while sufficiently compensating the threshold voltage.

The pixel circuit according to at least one embodiment of the present disclosure further includes a first reset circuit and a second reset circuit.

The first reset circuit is electrically connected to a first reset terminal, a reference voltage terminal, and the first node respectively. The first reset circuit is used to, under control of a first reset signal provided by the first reset terminal, control writing of a reference voltage provided by the reference voltage terminal into the first node.

The second reset circuit is electrically connected to a second reset terminal, a first initial voltage terminal, and a reset node respectively. The second reset circuit is used to, under control of a second reset signal provided by the second reset terminal, control writing of a first initial voltage provided by the first initial voltage terminal into the reset node.

The reset node is the second node or the third node. The third node is electrically connected to the first electrode of the light-emitting element.

In a specific implementation, the pixel circuit further includes a first reset circuit and a second reset circuit. The first reset circuit writes a reference voltage into the first node under control of the first reset signal. The second reset circuit writes a first reference voltage into the reset node under control of the second reset signal.

Figure 2:
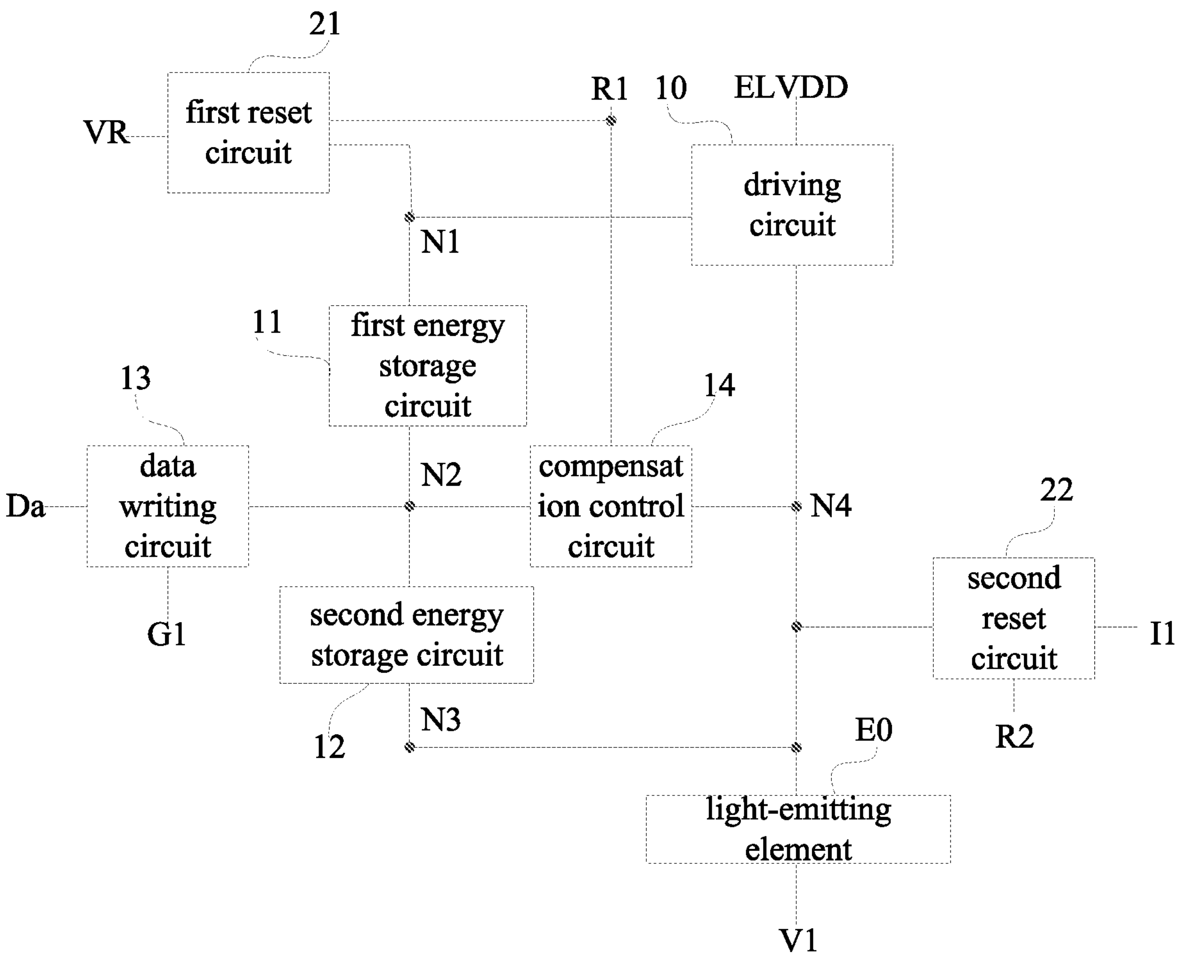
FIG. 2 is a schematic diagram of a pixel circuit according to at least one embodiment of the present disclosure.

As shown in FIG. 2, based on at least one embodiment of the pixel circuit shown in FIG. 1, the pixel circuit according to at least one embodiment of the present disclosure further includes a first reset circuit 21 and a second reset circuit 22.

The first reset circuit 21 is electrically connected to a first reset terminal R1, a reference voltage terminal VR, and the first node N1 respectively. The first reset circuit 21 is used to, under control of a first reset signal provided by the first reset terminal R1, control writing of a reference voltage Vref provided by the reference voltage terminal VR into the first node N1.

The second reset circuit 22 is electrically connected to a second reset terminal R2, a first initial voltage terminal I1, and a third node N3 respectively. The second reset circuit 22 is used to, under control of a second reset signal provided by the second reset terminal R2, control writing of a first initial voltage Vinit1 provided by the first initial voltage terminal I1 into the third node N3.

In at least one embodiment shown in FIG. 2, the reset node is the third node.

Figure 3:
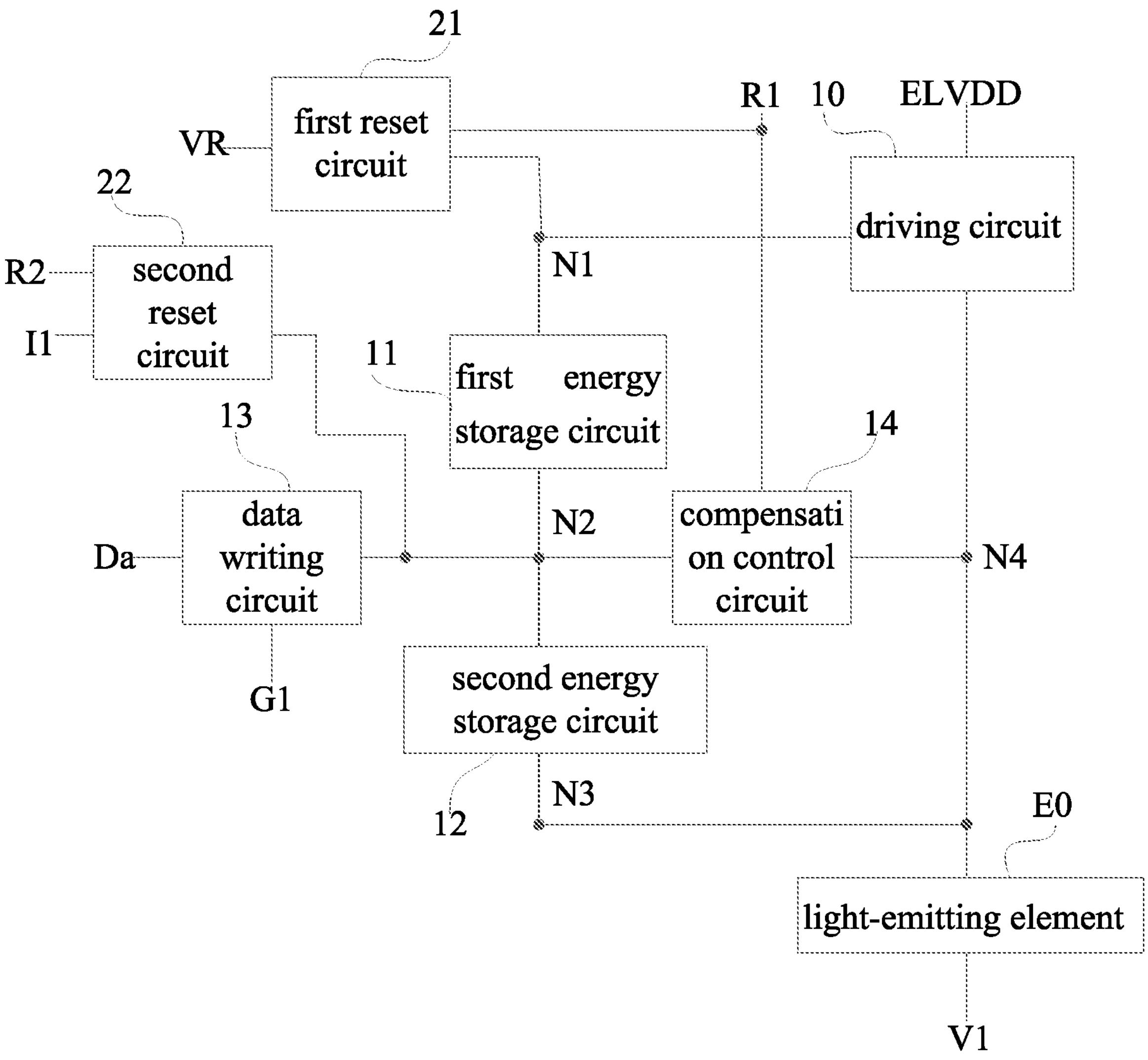
FIG. 3 is a schematic diagram of a pixel circuit according to at least one embodiment of the present disclosure.

As shown in FIG. 3, based on at least one embodiment of the pixel circuit shown in FIG. 1, the pixel circuit according to at least one embodiment of the present disclosure further includes a first reset circuit 21 and a second reset circuit 22.

The first reset circuit 21 is electrically connected to a first reset terminal R1, a reference voltage terminal VR, and the first node N1 respectively. The first reset circuit 21 is used to, under control of a first reset signal provided by the first reset terminal R1, control writing of a reference voltage Vref provided by the reference voltage terminal VR into the first node N1.

The second reset circuit 22 is electrically connected to a second reset terminal R2, a first initial voltage terminal I1, and a second node N2 respectively. The second reset circuit 22 is used to, under control of a second reset signal provided by the second reset terminal R2, control writing of a first initial voltage Vinit1 provided by the first initial voltage terminal I1 into the second node N2.

In at least one embodiment shown in FIG. 3, the reset node is the second node.

The pixel circuit according to at least one embodiment of the present disclosure further includes a third reset circuit.

The third reset circuit is electrically connected to the scanning line, a second initial voltage terminal, and a reset node respectively. The third reset circuit is used to, under control of the scanning signal, write a second initial voltage provided by the second initial voltage terminal into the reset node.

The data writing node is the second node, and the reset node is the third node; or alternatively, the data writing node is the third node, and the reset node is the second node.

In a specific implementation, the pixel circuit may further include a third reset circuit. Under control of a scanning signal, the third reset circuit writes a second initial voltage into a reset node.

Figure 4:
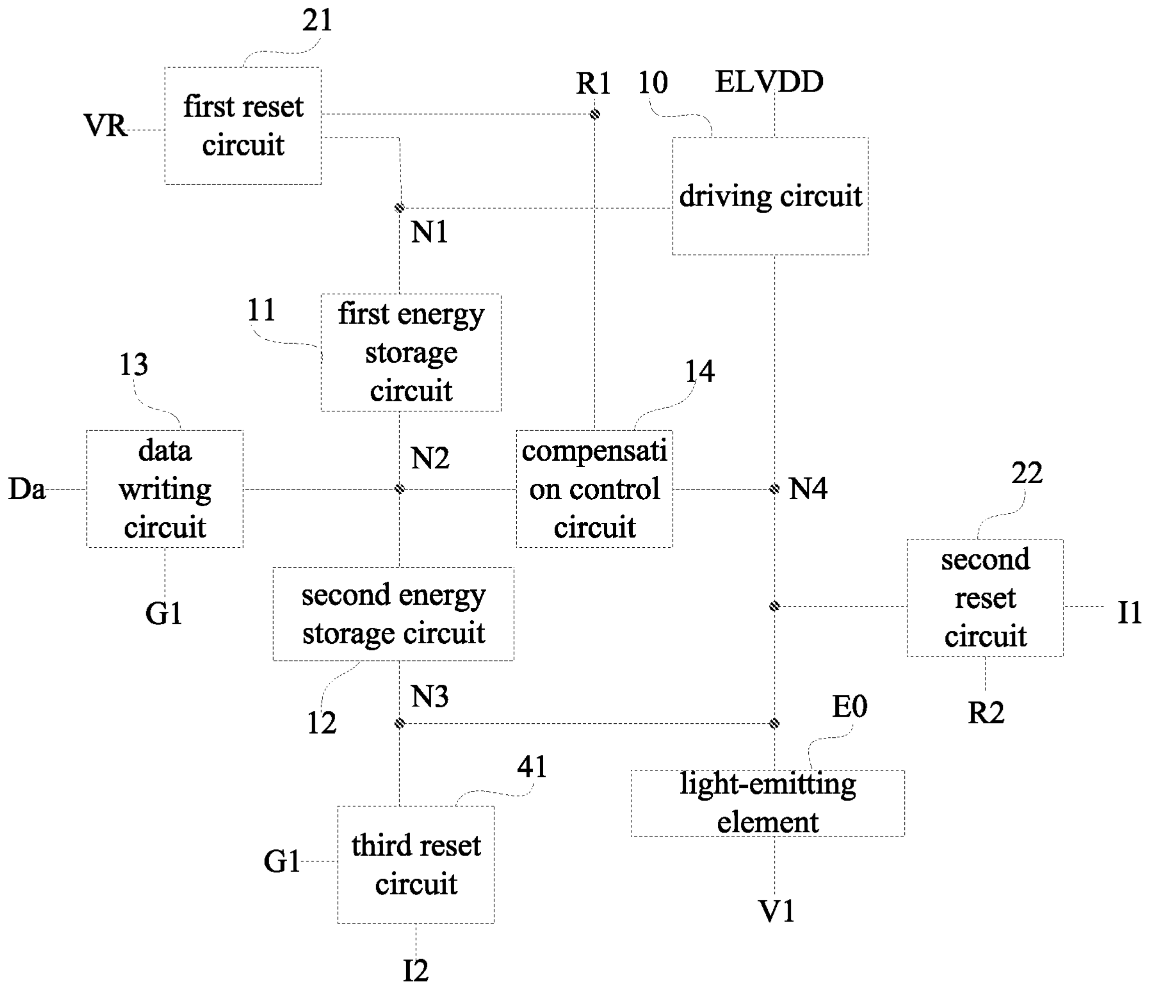
FIG. 4 is a schematic diagram of a pixel circuit according to at least one embodiment of the present disclosure.

As shown in FIG. 4, based on at least one embodiment of the pixel circuit shown in FIG. 2, the pixel circuit according to at least one embodiment of the present disclosure further includes a third reset circuit 41.

The third reset circuit 41 is electrically connected to the scanning line G1, a second initial voltage terminal I2, and the third node N3 respectively. The third reset circuit 41 is used to, under control of the scanning signal, write a second initial voltage Vinit2 provided by the second initial voltage terminal I2 into the third node N3.

In at least one embodiment shown in FIG. 4, the reset node is the third node N3.

Figure 5:
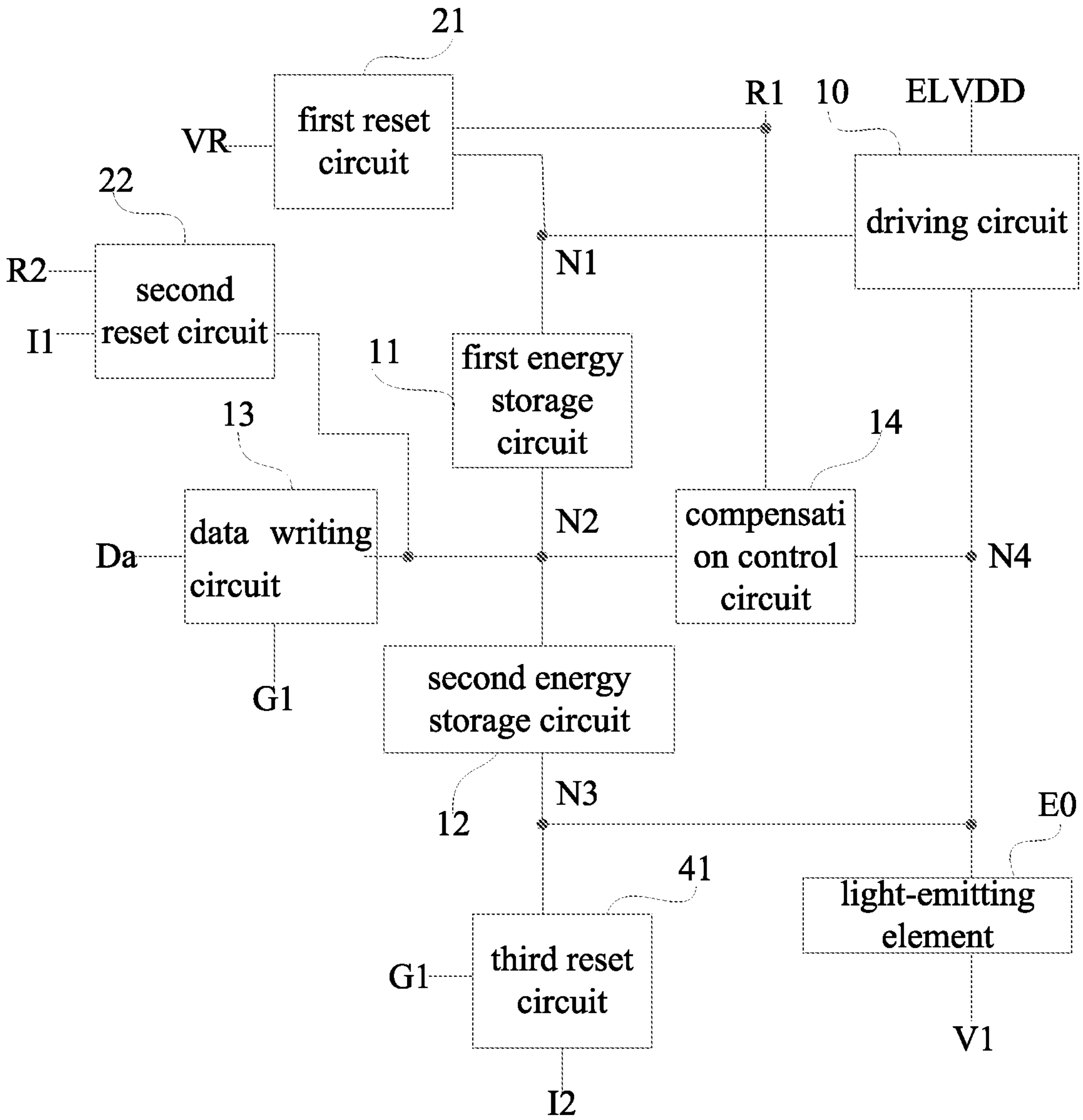
FIG. 5 is a schematic 1 diagram of a pixel circuit according to at least one embodiment of the present disclosure.

As shown in FIG. 5, based on at least one embodiment of the pixel circuit shown in FIG. 3, the pixel circuit according to at least one embodiment of the present disclosure further includes a third reset circuit 41.

The third reset circuit 41 is electrically connected to the scanning line G1, a second initial voltage terminal I2, and the third node N3 respectively. The third reset circuit 41 is used to, under control of the scanning signal, write a second initial voltage Vinit2 provided by the second initial voltage terminal I2 into the third node N3.

In at least one embodiment of the present disclosure, the pixel circuit further includes a first light-emitting control circuit.

The first terminal of the driving circuit is electrically connected to the power supply voltage terminal through the first light-emitting control circuit. The second terminal of the driving circuit is electrically connected to the first electrode of the light-emitting element.

A control terminal of the first light-emitting control circuit is electrically connected to the light-emitting control line. The first light-emitting control circuit is used to, under control of a light-emitting control signal provided by the light-emitting control line, control whether the power supply voltage terminal is connected with or disconnected from the first terminal of the driving circuit.

In a specific implementation, the pixel circuit may further include a first light-emitting control circuit. Under control of a light-emitting control signal, the first light-emitting control circuit controls whether the power supply voltage terminal is connected with or disconnected from the first terminal of the driving circuit.

Figure 6:
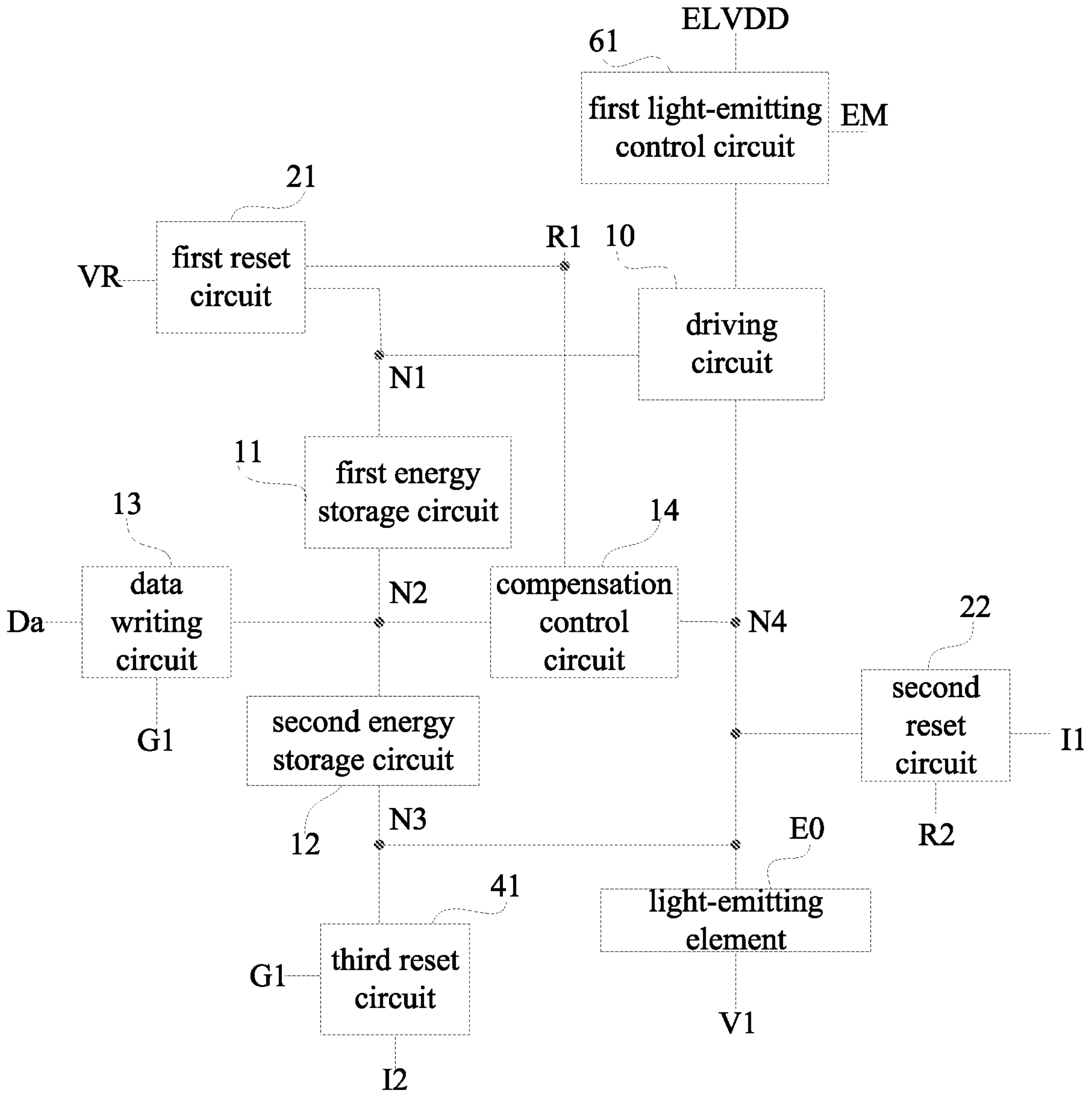
FIG. 6 is a schematic diagram of a pixel circuit according to at least one embodiment of the present disclosure.

As shown in FIG. 6, based on at least one embodiment of the pixel circuit shown in FIG. 4, the pixel circuit according to at least one embodiment of the present disclosure further includes a first light-emitting control circuit 61.

A first terminal of the driving circuit 10 is electrically connected to the power supply voltage terminal ELVDD through the first light-emitting control circuit 61.

A control terminal of the first light-emitting control circuit 61 is electrically connected to a light-emitting control line EM. The first light-emitting control circuit 61 is used to, under control of a light-emitting control signal provided by the light-emitting control line EM, control whether the power supply voltage terminal ELVDD is connected with or disconnected from the first terminal of the driving circuit 10.

Figure 7:
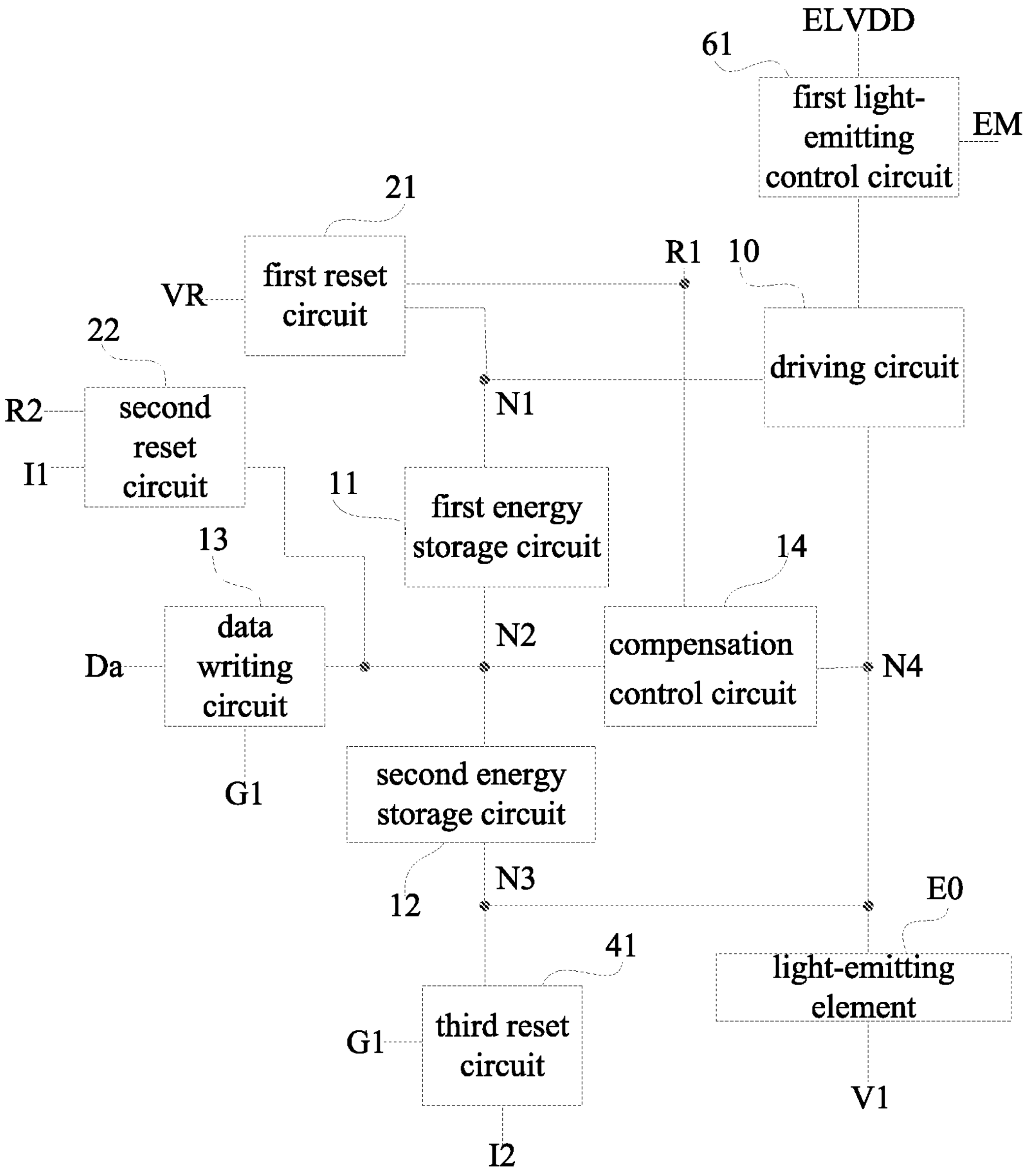
FIG. 7 is a schematic diagram of a pixel circuit according to at least one embodiment of the present disclosure.

As shown in FIG. 7, based on at least one embodiment of the pixel circuit shown in FIG. 5, the pixel circuit according to at least one embodiment of the present disclosure further includes a first light-emitting control circuit 61.

A first terminal of the driving circuit 10 is electrically connected to the power supply voltage terminal ELVDD through the first light-emitting control circuit 61.

A control terminal of the first light-emitting control circuit 61 is electrically connected to a light-emitting control line EM. The first light-emitting control circuit 61 is used to, under control of a light-emitting control signal provided by the light-emitting control line EM, control whether the power supply voltage terminal ELVDD is connected with or disconnected from the first terminal of the driving circuit 10.

In at least one embodiment of the present disclosure, the pixel circuit further includes a second light-emitting control circuit.

A first terminal of the driving circuit is electrically connected to the power supply voltage terminal. A second terminal of the driving circuit is electrically connected to the first electrode of the light-emitting element through the second light-emitting control circuit.

A control terminal of the second light-emitting control circuit is electrically connected to a light-emitting control line. The second light-emitting control circuit is used to, under control of a light-emitting control signal provided by the light-emitting control line, control whether the second terminal of the driving circuit is connected with or disconnected from the first electrode of the light-emitting element.

In a specific implementation, the pixel circuit may further include a second light-emitting control circuit. Under control of the light-emitting control circuit, the second light-emitting control circuit controls whether the second terminal of the driving circuit is connected with or disconnected from the first electrode of the light-emitting element.

Figure 8:
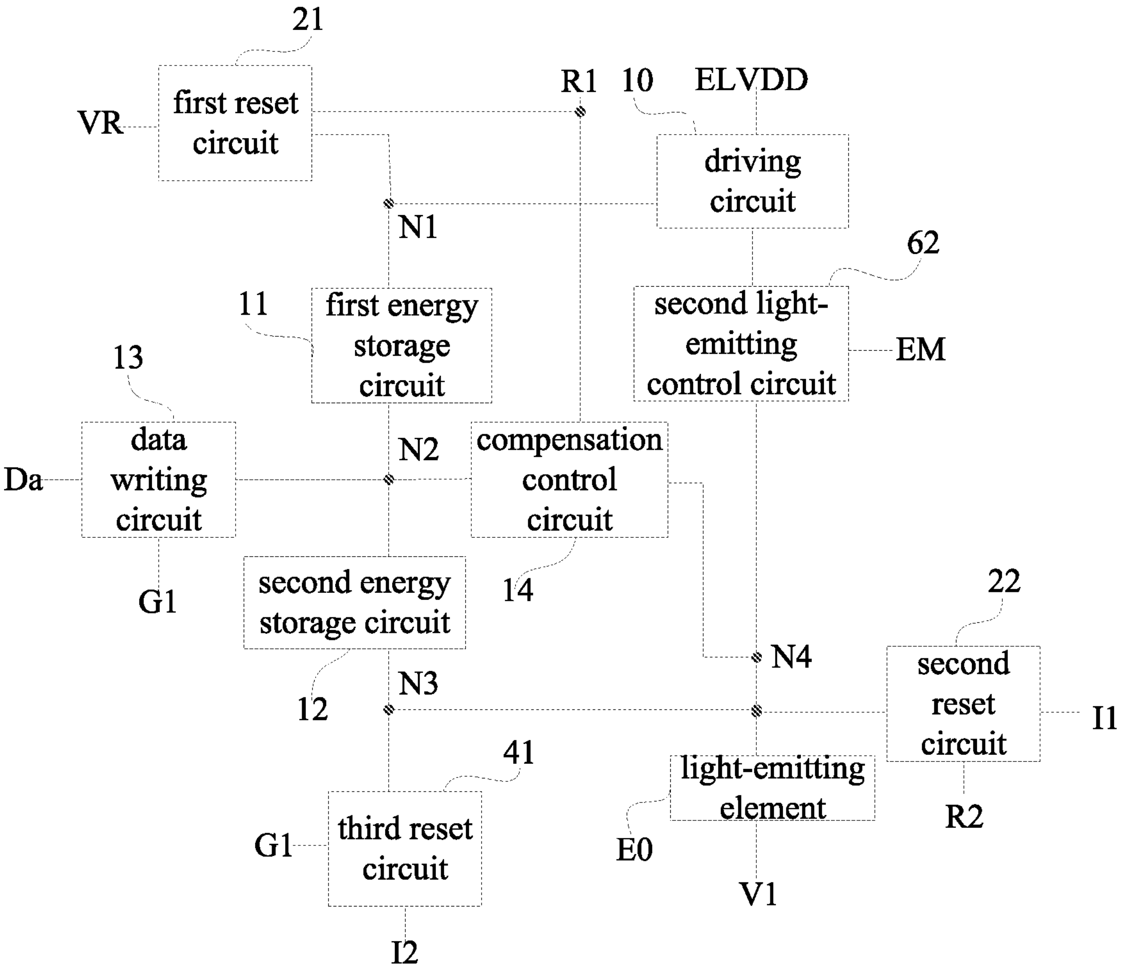
FIG. 8 is a schematic diagram of a pixel circuit according to at least one embodiment of the present disclosure.

As shown in FIG. 8, based on at least one embodiment of the pixel circuit shown in FIG. 4, the pixel circuit according to at least one embodiment of the present disclosure further includes a second light-emitting control circuit 62.

A second terminal of the driving circuit 10 is electrically connected to the first electrode of the light-emitting element E0 through the second light-emitting control circuit 62.

A control terminal of the second light-emitting control circuit 62 is electrically connected to the light-emitting control line EM. The second light-emitting control circuit 62 is used to, under control of a light-emitting control signal provided by the light-emitting control line EM, control whether the second terminal of the driving circuit 10 is connected with or disconnected from the first electrode of the light-emitting element E0.

The second reset circuit 22 is electrically connected to the third node N3, and the compensation node N4 is electrically connected to the third node N3.

Figure 9:
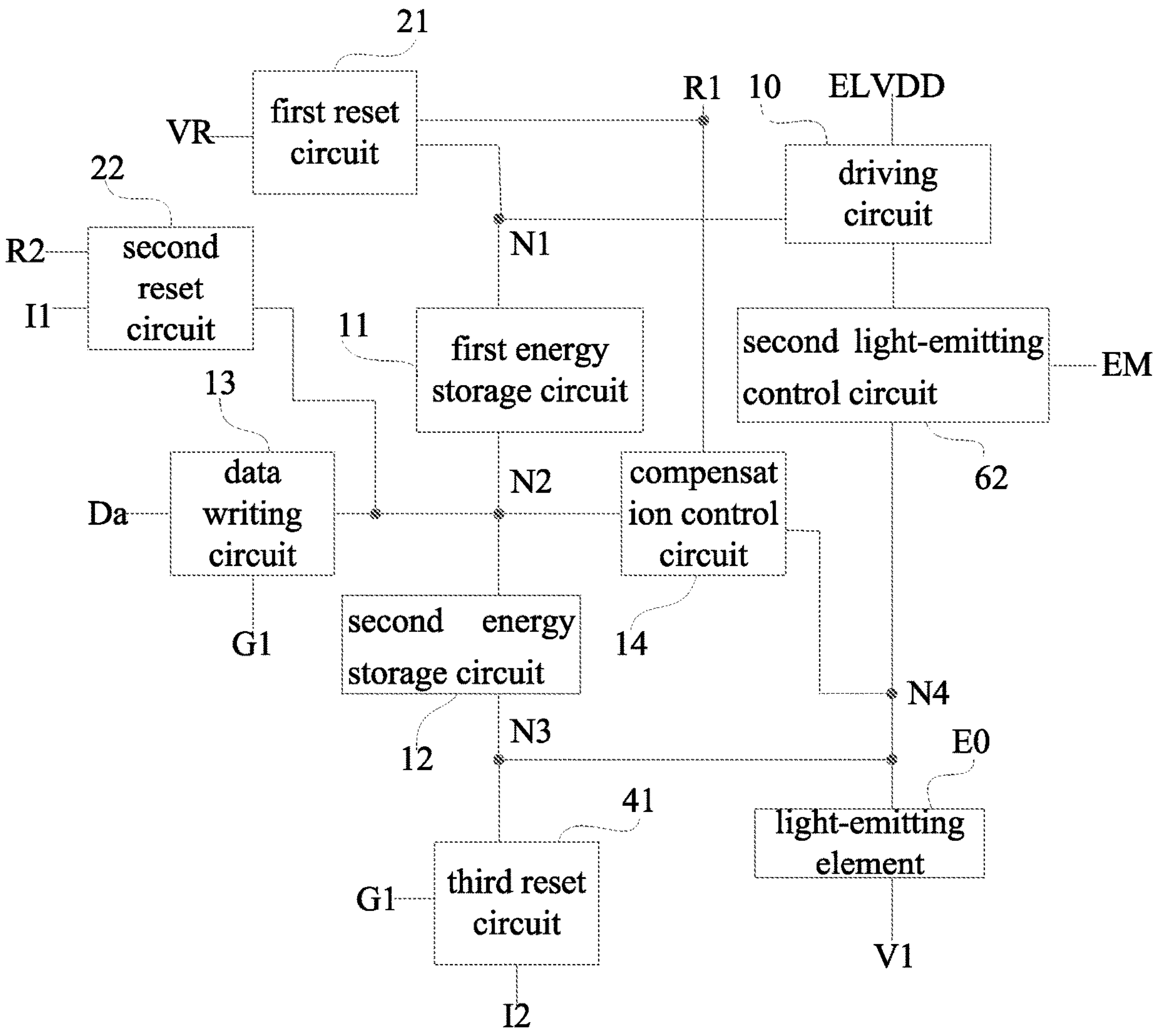
FIG. 9 is a schematic diagram of a pixel circuit according to at least one embodiment of the present disclosure.

As shown in FIG. 9, based on at least one embodiment of the pixel circuit shown in FIG. 5, the pixel circuit according to at least one embodiment of the present disclosure further includes a second light-emitting control circuit 62.

The second terminal of the driving circuit 10 is electrically connected to the first electrode of the light-emitting element E0 through the second light-emitting control circuit 62.

A control terminal of the second light-emitting control circuit 62 is electrically connected to a light-emitting control line EM. The second light-emitting control circuit 62 is used to, under control of a light-emitting control signal provided by the light-emitting control line EM, control whether the second terminal of the driving circuit 10 is connected with or disconnected from the first electrode of the light-emitting element E0.

The compensation node N4 is electrically connected to the third node N3.

Figure 10:
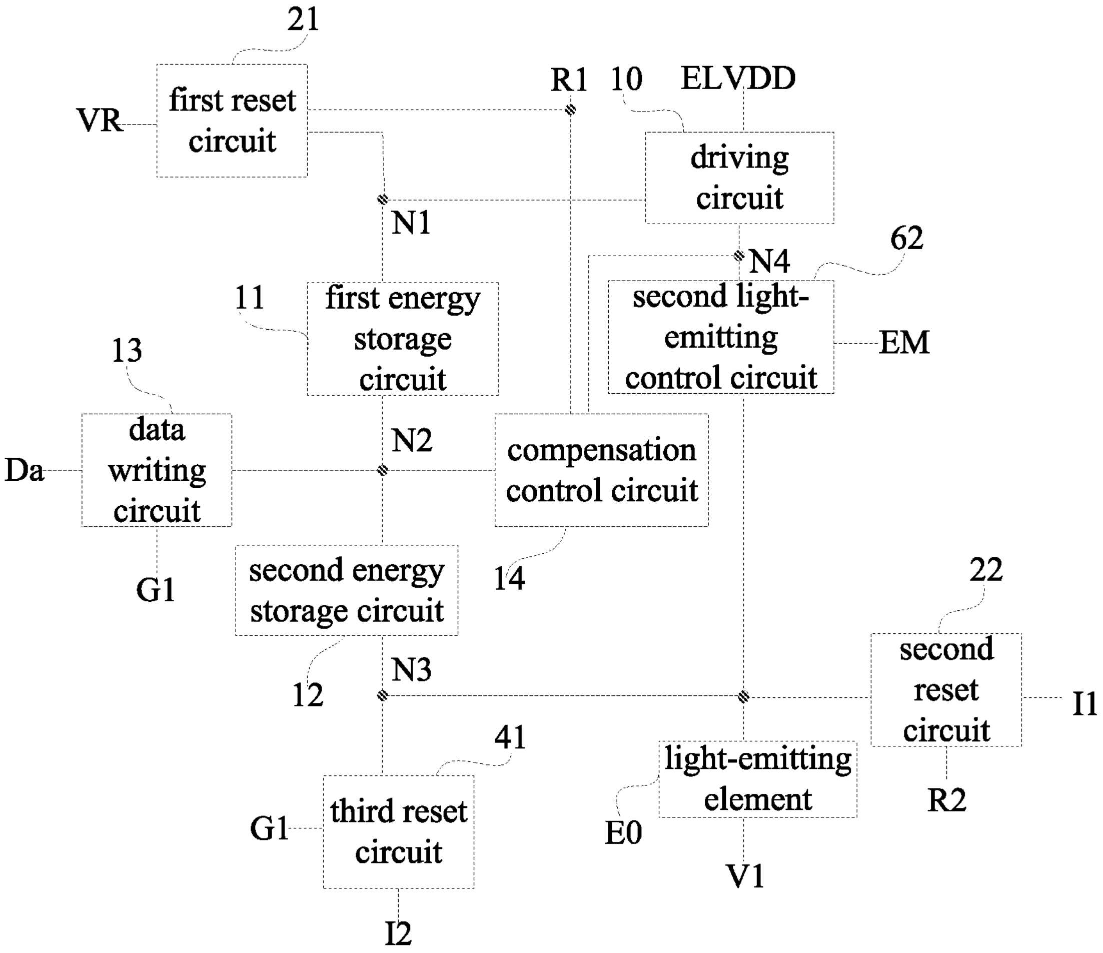
FIG. 10 is a schematic diagram of a pixel circuit according to at least one embodiment of the present disclosure.

A difference between at least one embodiment of the pixel circuit shown in FIG. 10 of the present disclosure and at least one embodiment of the pixel circuit shown in FIG. 8 of the present disclosure lies in that: the compensation node N4 is electrically connected to the second terminal of the driving circuit 10.

Figure 11:
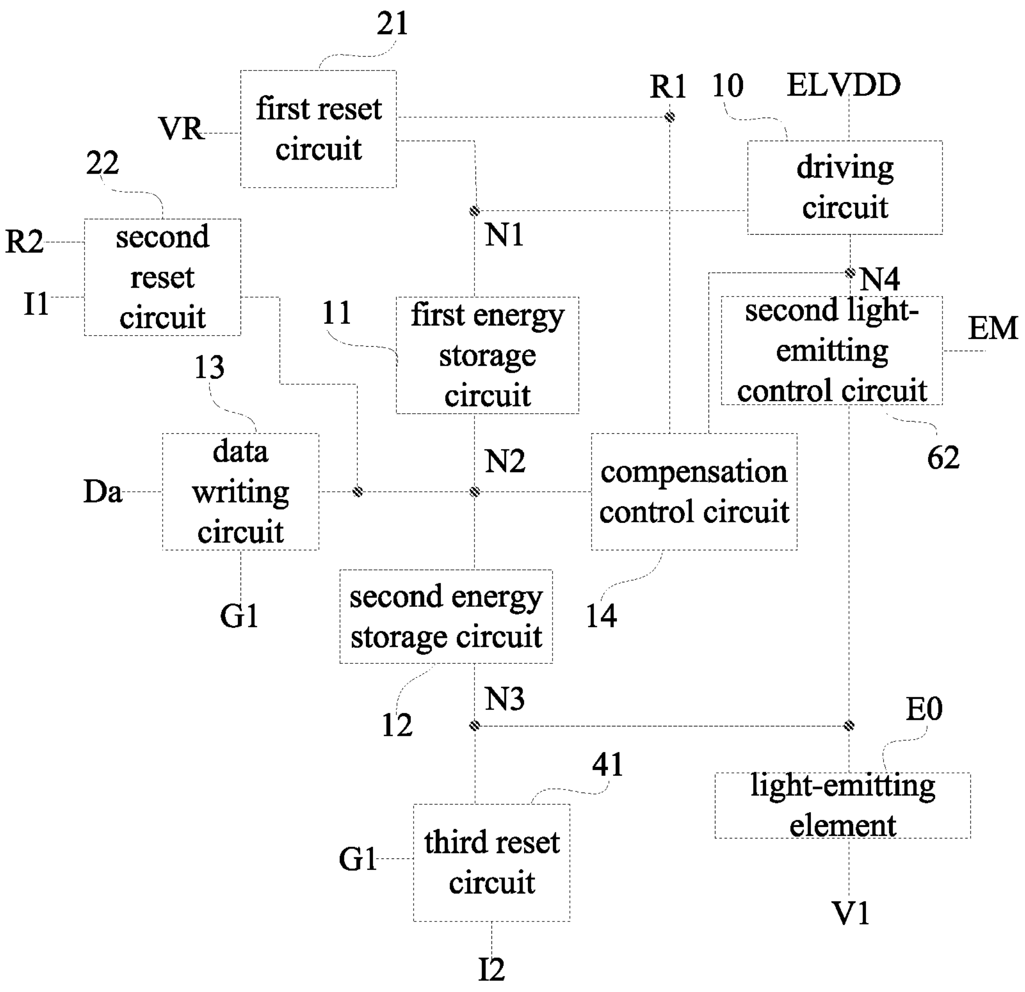
FIG. 11 is a schematic diagram of a pixel circuit according to at least one embodiment of the present disclosure.

A difference between at least one embodiment of the pixel circuit shown in FIG. 11 of the present disclosure and at least one embodiment of the pixel circuit shown in FIG. 9 of the present disclosure lies in that: the compensation node N4 is electrically connected to the second terminal of the driving circuit 10.

Figure 12:
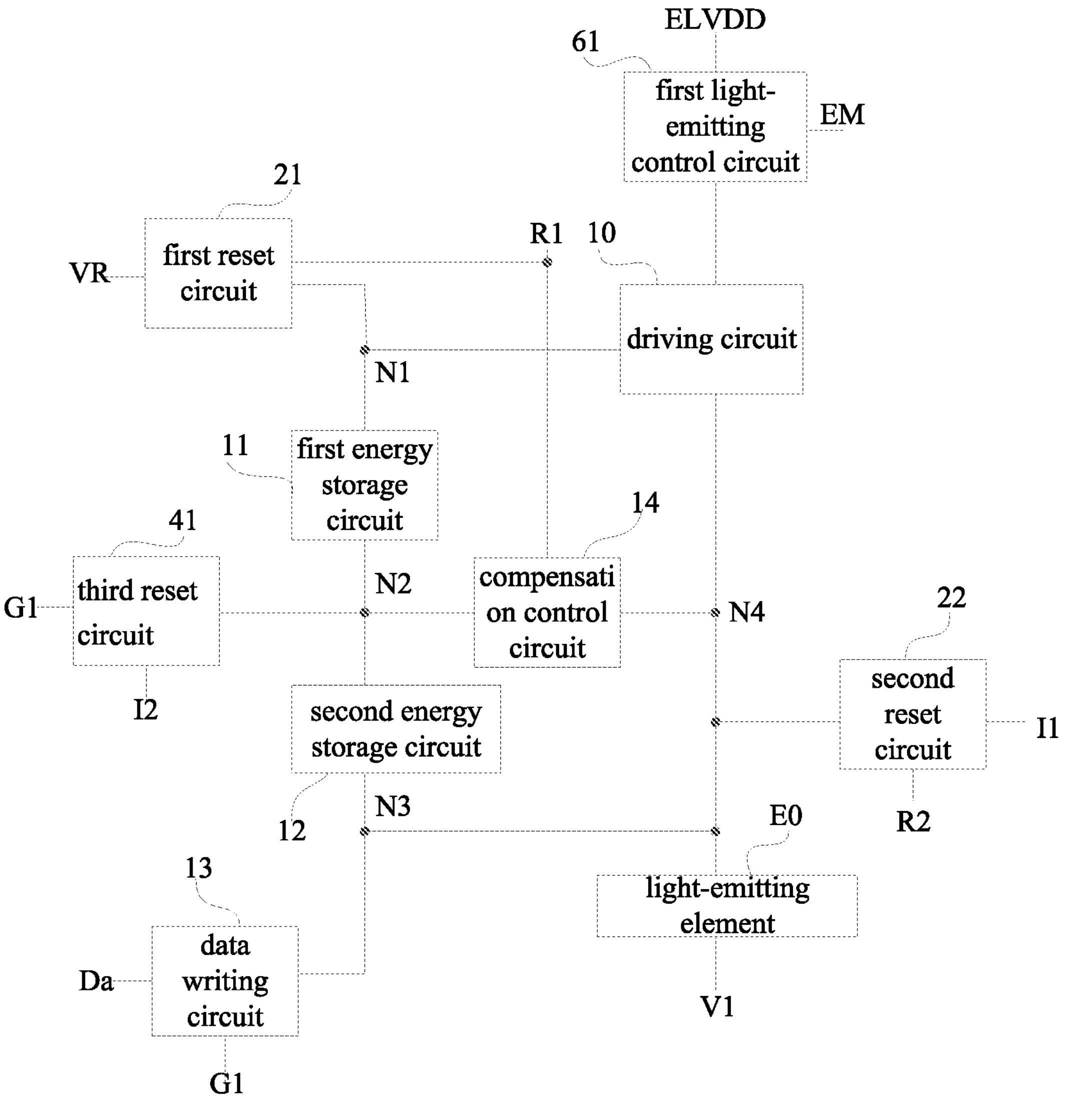
FIG. 12 is a schematic diagram of a pixel circuit according to at least one embodiment of the present disclosure.

A difference between at least one embodiment of the pixel circuit shown in FIG. 12 of the present disclosure and at least one embodiment of the pixel circuit shown in FIG. 6 of the present disclosure lies in that: the data writing node is the third node N3, and the reset node is the second node N2.

In at least one embodiment of the pixel circuit shown in FIG. 12 of the present disclosure, the data writing circuit 13 is electrically connected to a scanning line G1, a data line Da, and a third node N3 respectively. The data writing circuit 13 is used to, under control of a scanning signal provided by the scanning line G1, control writing of a data voltage Vdata on the data line Da into the third node N3.

The third reset circuit 41 is electrically connected to the scanning line G1, a second initial voltage terminal I2, and the second node N2 respectively. The third reset circuit 41 is used to, under control of the scanning signal, write a second initial voltage Vinit2 provided by the second initial voltage terminal I2 into the second node N2.

Optionally, the data writing circuit includes a first transistor, and the compensation control circuit includes a second transistor.

A gate electrode of the first transistor is electrically connected to the scanning line; a first electrode of the first transistor is electrically connected to the data line; and a second electrode of the first transistor is electrically connected to the data writing node.

A gate electrode of the second transistor is electrically connected to the first reset terminal; a first electrode of the second transistor is electrically connected to the second node; and a second electrode of the second transistor is electrically connected to the compensation node.

Optionally, the driving circuit includes a driving transistor, the first reset circuit includes a third transistor, and the second reset circuit includes a fourth transistor.

A gate electrode of the driving transistor is electrically connected to the first node; a first electrode of the driving transistor is electrically connected to the first terminal of the driving circuit; and a second electrode of the driving transistor is electrically connected to the second terminal of the driving circuit.

A gate electrode of the third transistor is electrically connected to the first reset terminal; a first electrode of the third transistor is electrically connected to the reference voltage terminal; and a second electrode of the third transistor is electrically connected to the first node.

A gate electrode of the fourth transistor is electrically connected to the second reset terminal; a first electrode of the fourth transistor is electrically connected to the first initial voltage terminal; and a second electrode of the fourth transistor is electrically connected to the reset node.

Optionally, the first energy storage circuit includes a first capacitor, and the second energy storage circuit includes a second capacitor.

A first terminal of the first capacitor is electrically connected to the first node, and a second terminal of the first capacitor is electrically connected to the second node.

A first terminal of the second capacitor is electrically connected to the second node, and a second terminal of the second capacitor is electrically connected to the third node.

Optionally, the third reset circuit includes a fifth transistor.

A gate electrode of the fifth transistor is electrically connected to the scanning line; a first electrode of the fifth transistor is electrically connected to the second initial voltage terminal; and a second electrode of the fifth transistor is electrically connected to the reset node. Optionally, the first light-emitting control circuit includes a sixth transistor.

A gate electrode of the sixth transistor is electrically connected to the light-emitting control line; a first electrode of the sixth transistor is electrically connected to the power supply voltage terminal; and a second electrode of the sixth transistor is electrically connected to the first terminal of the driving circuit.

Optionally, the second light-emitting control circuit includes a seventh transistor.

A gate electrode of the seventh transistor is electrically connected to the light-emitting control line; a first electrode of the seventh transistor is electrically connected to the second terminal of the driving circuit; and a second electrode of the seventh transistor is electrically connected to the first electrode of the light-emitting element.

Figure 13:
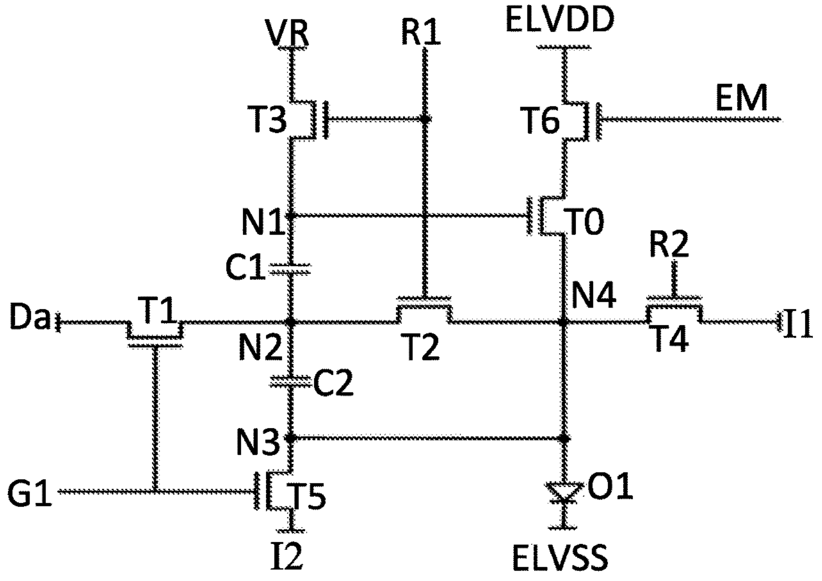
FIG. 13 is a circuit diagram of a pixel circuit according to at least one embodiment of the present disclosure.

As shown in FIG. 13, based on at least one embodiment of the pixel circuit shown in FIG. 6, the light-emitting element is an organic light-emitting diode O1; the data writing circuit includes a first transistor T1, and the compensation control circuit includes a second transistor T2.

A gate electrode of the first transistor T1 is electrically connected to the scanning line G1; a drain electrode of the first transistor T1 is electrically connected to the data line Da; and a source electrode of the first transistor T1 is electrically connected to the second node N2.

A gate electrode of the second transistor T2 is electrically connected to the first reset terminal R1; a drain electrode of the second transistor T2 is electrically connected to the second node N2; and a source electrode of the second transistor T2 is electrically connected to the compensation node N4. The compensation node N4 is electrically connected to the third node N3. The third node N3 is electrically connected to an anode of the organic light-emitting diode O1.

The driving circuit includes a driving transistor TO, the first reset circuit includes a third transistor T3, and the second reset circuit includes a fourth transistor T4.

A gate electrode of the driving transistor TO is electrically connected to the first node N1.

A gate electrode of the third transistor T3 is electrically connected to the first reset terminal R1; a drain electrode of the third transistor T3 is electrically connected to the reference voltage terminal VR; and a source electrode of the third transistor T3 is electrically connected to the first node N1.

A gate electrode of the fourth transistor T4 is electrically connected to the second reset terminal R2; a drain electrode of the fourth transistor T4 is electrically connected to the first initial voltage terminal I1; and a source electrode of the fourth transistor T4 is electrically connected to the third node N3.

The first energy storage circuit includes a first capacitor C1, and the second energy storage circuit includes a second capacitor C2.

A first terminal of the first capacitor C1 is electrically connected to the first node N1, and a second terminal of the first capacitor C1 is electrically connected to the second node N2.

A first terminal of the second capacitor C2 is electrically connected to the second node N2, and a second terminal of the second capacitor C2 is electrically connected to the third node N3.

The third reset circuit includes a fifth transistor T5.

A gate electrode of the fifth transistor T5 is electrically connected to the scanning line G1, a drain electrode of the fifth transistor T5 is electrically connected to the second initial voltage terminal I2, and a drain electrode of the fifth transistor T5 is electrically connected to the third node N3.

The first light-emitting control circuit includes a sixth transistor T6.

A gate electrode of the sixth transistor T6 is electrically connected to the light-emitting control line EM; a drain electrode of the sixth transistor T6 is electrically connected to the power supply voltage terminal ELVDD; and a source electrode of the sixth transistor T6 is electrically connected to a source electrode of the driving transistor TO.

A drain electrode of the driving transistor TO is electrically connected to the anode of the organic light-emitting diode O1.

A cathode of the organic light-emitting diode O1 is electrically connected to a low voltage terminal ELVSS.

In at least one embodiment shown in FIG. 13, all transistors are n-type transistors, but it is not limited to this.

In at least one embodiment of the present disclosure, the gate electrode of T2 and the gate electrode of T3 may also be electrically connected to different control terminals, and the gate electrode of T1 and the gate electrode of T5 may also be electrically connected to different control terminals.

Optionally, a voltage value of Vinit1 may be the same as a voltage value of Vinit2, and both may be equal to VSS; and Vref may also be equal to VDD, but it is not limited to this.

In at least one embodiment of the present disclosure, VDD represents a voltage value of the power supply voltage provided by ELVDD, and VSS represents a voltage value of the low voltage signal provided by ELVSS.

Figure 14:
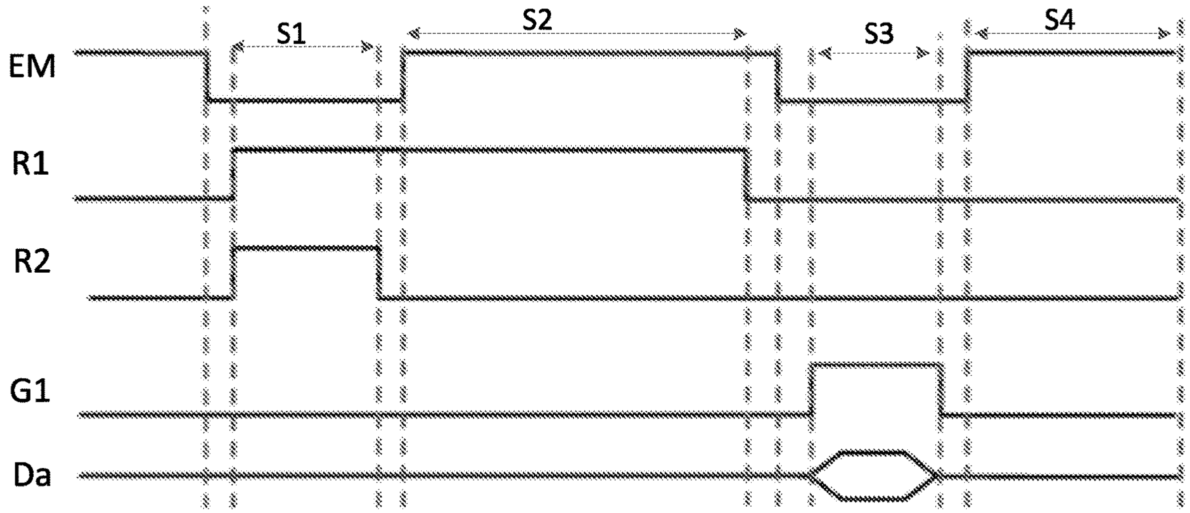
FIG. 14 is an operation sequence diagram of at least one embodiment of the pixel circuit shown in FIG. 13 of the present disclosure.

As shown in FIG. 14, when at least one embodiment of the pixel circuit shown in FIG. 13 of the present disclosure is in operation, a display period may include a reset phase S1, a compensation phase S2, a writing phase S3, and a light-emitting phase S4, which are set in sequence.

In the reset phase S1, EM provides a low voltage signal, R1 provides a high voltage signal, R2 provides a high voltage signal, G1 provides a low voltage signal, and T2 and T3 are turned on, thereby writing a reference voltage Vref provided by the reference voltage terminal VR to the first node N1, so that at stating of the compensation phase S2, the driving transistor TO can be turned on; T4 is turned on, and a first initial voltage Vinit1 provided by I1 is written into N2 and N4, thereby resetting potentials of N2 and N4; since there is no transistor between N3 and N4, an anode voltage of O1 and the potential of N3 can be reset at the same time.

In the compensation phase S2, EM provides a high voltage signal, R1 provides a high voltage signal, R2 provides a low voltage signal, G1 provides a low voltage signal, and T2, T3 and T6 are turned on.

At starting of the compensation phase S2, TO is turned on, and the power supply voltage provided by ELVDD charges the capacitor through T6, TO and T2 to change the potential of N4; until the potential of N4 becomes Vref-Vth, TO is turned off, thereby completing the threshold voltage compensation for TO; Vref-VDD needs to be less than the threshold voltage Vth of TO to enable turning off TO.

In the writing phase S3, EM provides a low voltage signal, R1 and R2 provide a low voltage signal, G1 provides a high voltage signal, Da provides a data voltage Vdata, T5 and T1 are turned on, the data line Da writes the data voltage Vdata into the second node N2, and I2 writes a second initial voltage Vinit2 into the third node N3; the first node N1 is in a floating state, and the potential of N1 changes with the change in the potential of N2, with equal changes; Vdata is written into N2 through T1, and the potential of N2 changes from Vref-Vth to Vdata, with the change in the potential of N2 being Vdata-(Vref-Vth); at this time, the potential of N1 becomes Vref+Vdata-(Vref-Vth), that is, the potential of N1 becomes Vdata+Vth; T5 is turned on, the potential of N3 becomes Vinit2, and a difference between the potential of N1 and the potential of N3 is Vdata+Vth-Vinit2.

In the light-emitting phase S4, EM provides a high voltage signal, R1 and R2 provide a low voltage signal, G1 provides a low voltage signal, and TO and T6 are turned on; N1 and N2 are in a floating state, and the potentials of N1 and N2 change with the change in the potential of N3, with equal changes; TO drives O1 to charge until O1 stably emits light; at this time, the potential of N3 is VSS+Voled, where Voled is a turn-on voltage of 01; the change in the potential of N3 is VSS+Voled−Vinit2, and the potential of N1 is VSS+Voled−Vinit2+Vdata+Vth; a gate-source voltage of T0 is Vdata+Vth-Vinit2, and T0 operates in the saturation region.

In the light-emitting phase S4, a driving current I for T0 to drive O1 to emit light, equals $K(Vdata-Vinit2)^2$, where K is a current coefficient of T0. It can be seen that the driving current I is not related to the threshold voltage of the driving transistor T0, VSS and Voled, that is, at least one embodiment of the pixel circuit shown in FIG. 13 of the present disclosure can compensate for the uneven threshold voltage of the driving transistor T0, a voltage drop of the low voltage terminal ELVSS, and the uneven display caused by the aging of the organic light-emitting diode, thereby improving the display effect.

When at least one embodiment of the pixel circuit shown in FIG. 13 of the present disclosure is in operation, since the threshold voltage compensation process and the data voltage writing process are separated, the threshold voltage compensation can be performed for a long period of time to ensure better threshold voltage compensation, and the driving rate can be improved; for example, the driving frequency can be 120 Hz, 180 Hz or 240 Hz, which is beneficial to the improvement of effects in scenarios such as gaming, and can improve the accuracy of the light-emitting current and improve the display quality.

When at least one embodiment of the pixel circuit shown in FIG. 13 of the present disclosure is in operation, it only needs to use four sets of GOA (Gate electrode On Array, i.e., a gate driving circuit set on an array substrate) to provide the light-emitting control signal, the first reset signal, the second reset signa and the scanning signal respectively, which can reduce the number of used GOAs and is conducive to achieve a narrow bezel.

Figure 15:
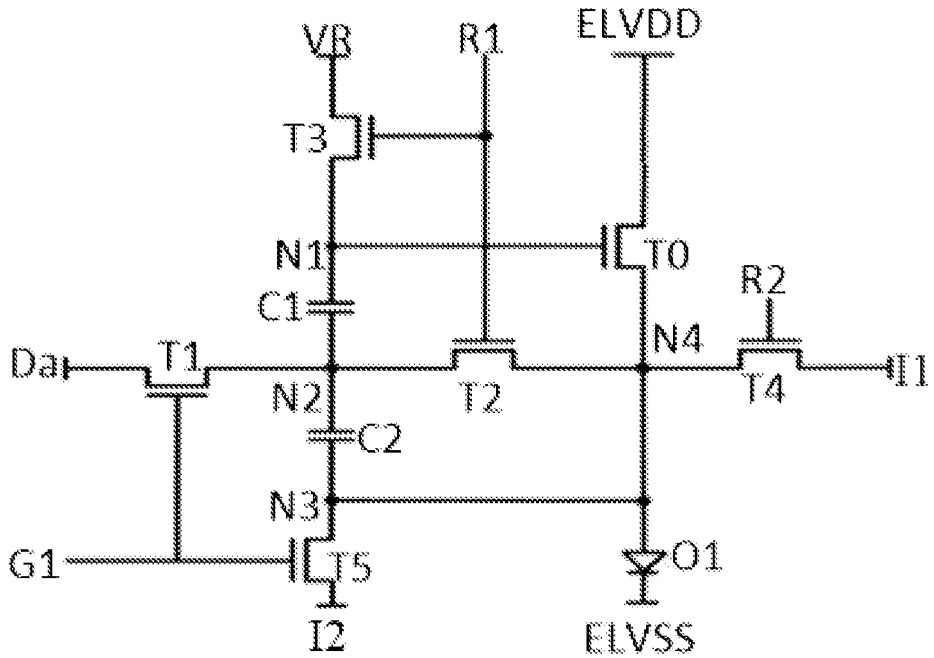
FIG. 15 is a circuit diagram of a pixel circuit according to at least one embodiment of the present disclosure.

A difference between at least one embodiment of the pixel circuit shown in FIG. 15 of the present disclosure and at least one embodiment of the pixel circuit shown in FIG. 12 of the present disclosure lies in that the sixth transistor T6 for light-emitting control is not provided.

At least one embodiment of the pixel circuit shown in FIG. 15 of the present disclosure can use merely three sets of GOA, which can further achieve a narrow bezel.

Figure 16:
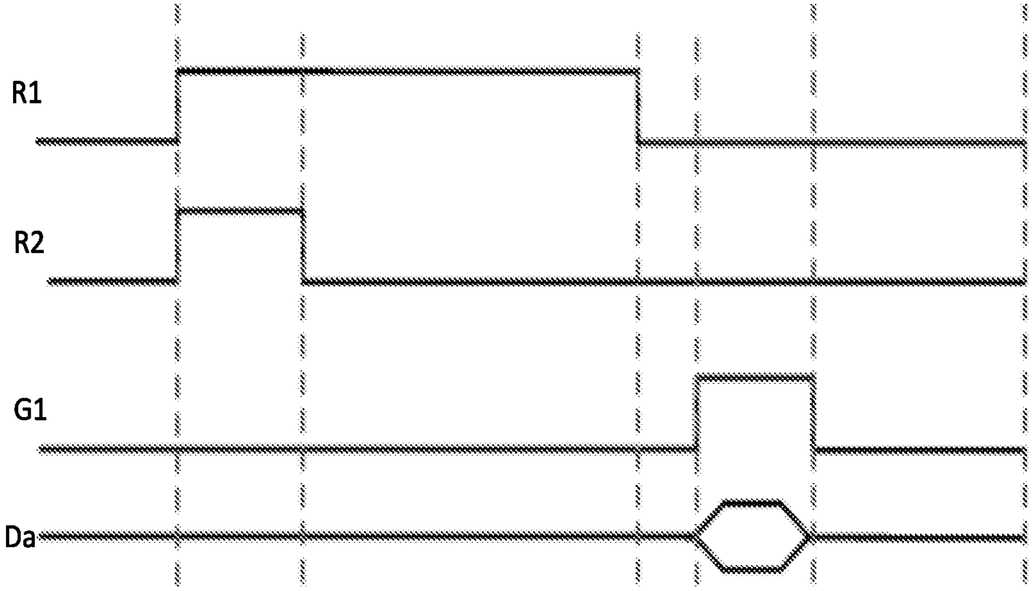
FIG. 16 is an operation sequence diagram of at least one embodiment of the pixel circuit shown in FIG. 15 of the present disclosure.

FIG. 16 shows an operation sequence diagram of at least one embodiment of the pixel circuit shown in FIG. 15 of the present disclosure.

Figure 17:
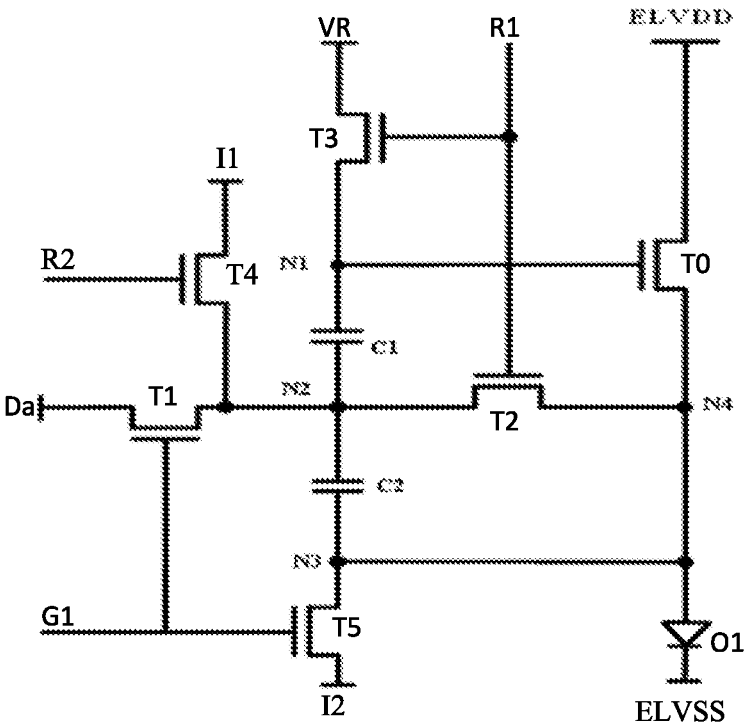
FIG. 17 is a circuit diagram of a pixel circuit according to at least one embodiment of the present disclosure.

A difference between at least one embodiment of the pixel circuit shown in FIG. 17 of the present disclosure and at least one embodiment of the pixel circuit shown in FIG. 15 of the present disclosure lies in that: the source electrode of T4 is electrically connected to the second node N2.

Figure 18:
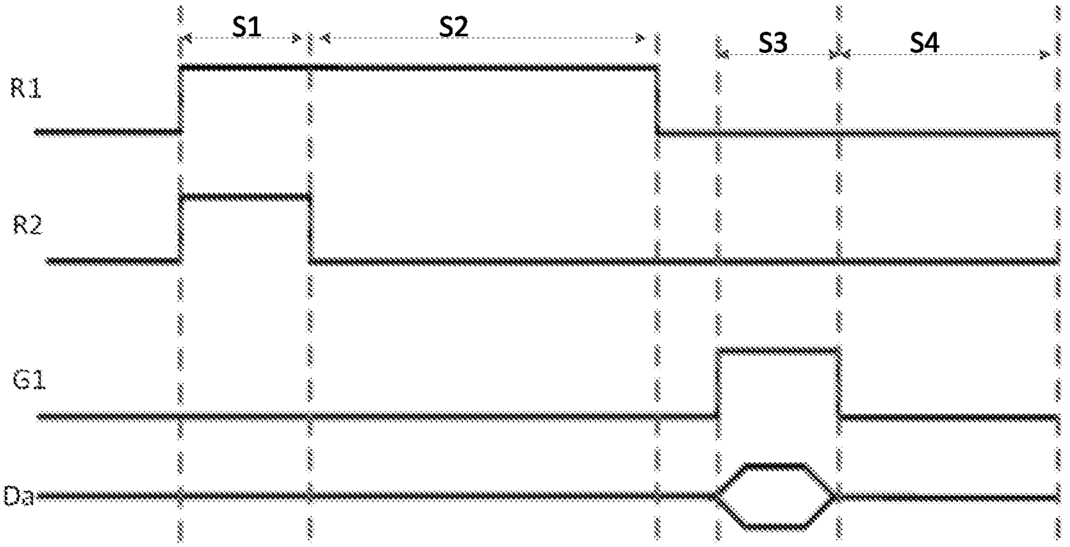
FIG. 18 is an operation sequence diagram of at least one embodiment of the pixel circuit shown in FIG. 17 of the present disclosure.

As shown in FIG. 18, when at least one embodiment of the pixel circuit shown in FIG. 17 of the present disclosure is in operation, a display period may include a reset phase S1, a compensation phase S2, a data writing phase S3, and a light-emitting phase S4, which are set in sequence.

In the reset phase S1, both R1 and R2 provide a high voltage signal, G1 provides a low voltage signal, and T2, T3 and T4 are all turned on; I1 writes a first initial voltage Vinit1 into N2, N3, and N4, and a reference voltage Vref provided by VR is written into N1.

In the compensation phase S2, R1 provides a high voltage signal, R2 provides a low voltage signal, G1 provides a low voltage signal, and T2 and T3 are turned on.

At starting of the compensation phase S2, T0 is turned on, and the power supply voltage provided by ELVDD charges the capacitor through T0 and T2 to change the potential of N4; until the potential of N4 becomes Vref-Vth, T0 is turned off, thereby completing the threshold voltage compensation for T0; Vref-VDD needs to be less than the threshold voltage Vth of T0.

In the writing phase S3, R1 and R2 provide a low voltage signal, G1 provides a high voltage signal, Da provides a data voltage Vdata, T5 and T1 are turned on; the data line Da writes the data voltage Vdata into the second node N2, and 12 writes a second initial voltage Vinit2 into the third node N3; the first node N1 is in a floating state, and the potential of N1 changes with the change in the potential of N2, with equal changes; Vdata is written into N2 through T1, and the potential of N2 changes from Vref-Vth to Vdata, with the change in the potential of N2 being Vdata-(Vref-Vth); at this point, the potential of N1 becomes Vref+Vdata-(Vref-Vth), that is, the potential of N1 becomes Vdata+Vth; T5 is turned on, the potential of N3 becomes Vinit2, and a difference between the potential of N1 and the potential of N3 is Vdata+Vth-Vinit2.

In the light-emitting phase S4, R1 and R2 provide a low voltage signal, and G1 provides a low voltage signal; T0, N1 and N2 are in a floating state, and the potentials of N1 and N2 change with the change in the potential of N3, with equal changes; T0 drives O1 to charge until O1 stably emits light; at this point, the potential of N3 is VSS+Voled, where Voled is a turn-on voltage of 01; the change in the potential of N3 is VSS+Voled−Vinit2, and the potential of N1 is VSS+Voled−Vinit2+Vdata+Vth; a gate-source voltage of T0 is Vdata+Vth-Vinit2, and T0 operates in the saturation region.

In the light-emitting phase S4, the driving current I for T0 to drive O1 to emit light, equals $K(Vdata-Vinit2)^2$;

where K is the current coefficient of T0. It can be seen that the driving current I is not related to the threshold voltage of the driving transistor T0, VSS and Voled, that is, at least one embodiment of the pixel circuit shown in FIG. 17 of the present disclosure can compensate for the uneven threshold voltage of the driving transistor T0, the voltage drop of the low voltage terminal ELVSS, and the uneven display caused by the aging of the organic light-emitting diode, thereby improving the display effect.

At least one embodiment of the pixel circuit shown in FIG. 17 of the present disclosure can use merely three sets of GOA, which can further achieve a narrow bezel.

Figure 19:
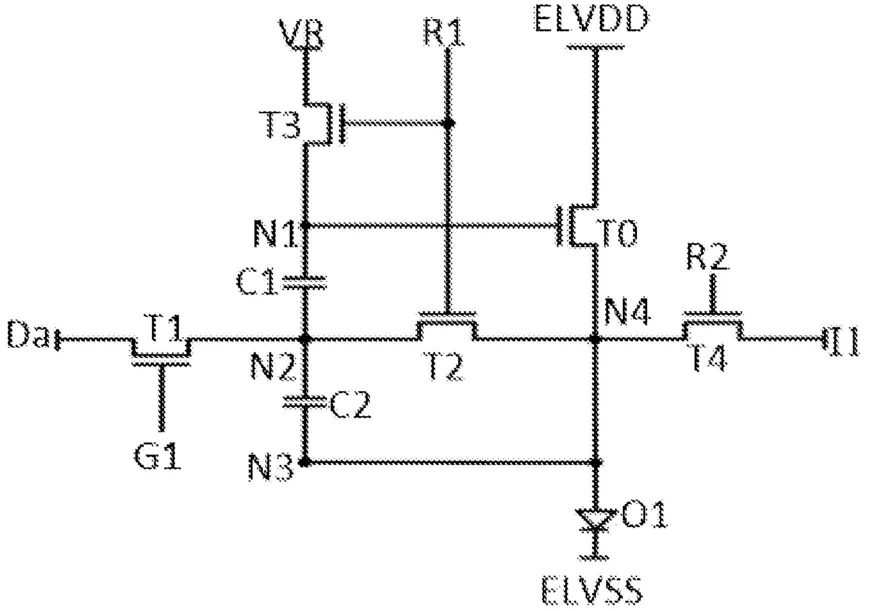
FIG. 19 is a circuit diagram of a pixel circuit according to at least one embodiment of the present disclosure.

A difference between at least one embodiment of the pixel circuit shown in FIG. 19 of the present disclosure and at least one embodiment of the pixel circuit shown in FIG. 15 of the present disclosure lies in that T5 is not provided.

Figure 20:
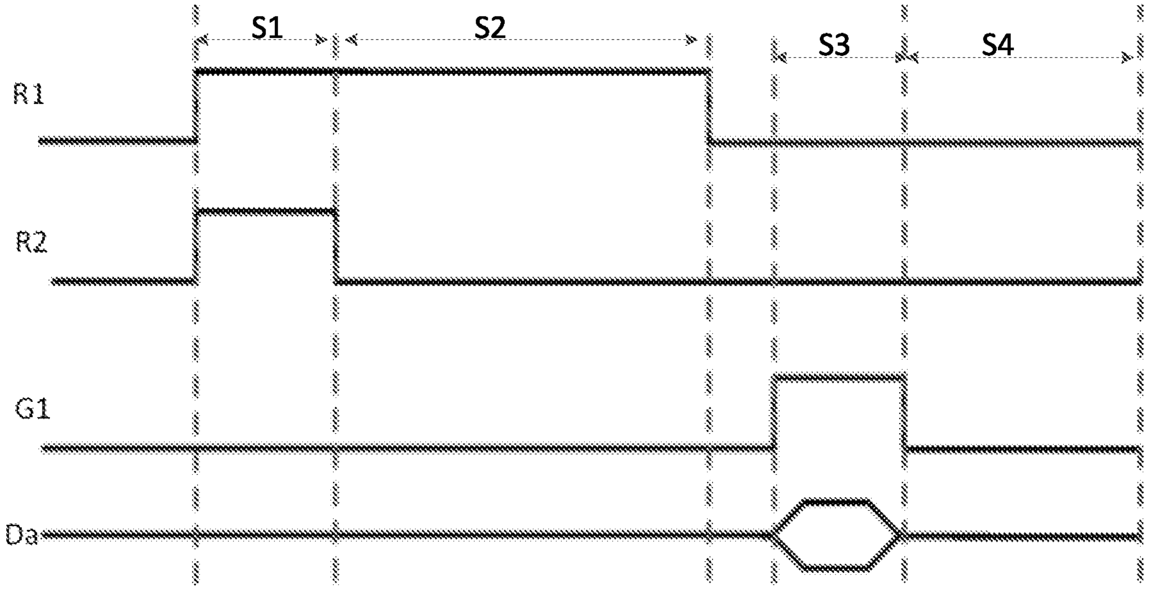
FIG. 20 is an operation sequence diagram of at least one embodiment of the pixel circuit shown in FIG. 19 of the present disclosure.

As shown in FIG. 20, when at least one embodiment of the pixel circuit shown in FIG. 19 of the present disclosure is in operation, a display period may include a reset phase S1, a compensation phase S2, a data writing phase S3, and a light-emitting phase S4, which are set in sequence.

In the reset phase S1, both R1 and R2 provide a high voltage signal, G1 provides a low voltage signal, and T2, T3, and T4 are all turned on; I1 writes a first initial voltage Vinit1 into N2, N3, and N4, and a reference voltage Vref provided by VR is written into N1.

In the compensation phase S2, R1 provides a high voltage signal, R2 provides a low voltage signal, G1 provides a low voltage signal, and T2 and T3 are turned on.

At starting of the compensation phase S2, T0 is turned on, and the power supply voltage provided by ELVDD charges the capacitor through T0 and T2 to change the potential of N4; until the potential of N4 becomes Vref-Vth, T0 is turned off, thereby completing the threshold voltage compensation for T0; Vref-VDD needs to be less than the threshold voltage Vth of T0.

In the data writing phase S3, R1 provides a low voltage signal, R2 provides a high voltage signal, G1 provides a high voltage signal, T4 is turned on, I1 provides the first initial voltage Vinit1 to N3, Da provides the data voltage Vdata, T2 is turned on, and the data line Da writes the data voltage Vdata into the second node N2; the first node N1 is in a floating state; the potential of N1 changes with the change in the potential of N2, with equal changes; Vdata is written into N2 through T1, and the potential of N2 changes from Vref-Vth to Vdata, with the change in the potential of N2 being Vdata-(Vref-Vth); at this point, the potential of N1 becomes Vref+Vdata-(Vref-Vth), that is, the potential of N1 becomes Vdata+Vth; T4 is turned on, the potential of N3 becomes Vinit1, and a difference between the potential of N1 and the potential of N3 is Vdata+Vth-Vinit1.

In the light-emitting phase S4, R1 and R2 provide a low voltage signal, and G1 provides a low voltage signal; T0, N1 and N2 are in a floating state, and the potentials of N1 and N2 change with the change in the potential of N3, with equal changes; T0 drives O1 to charge until O1 stably emits light; at this point, the potential of N3 is VSS+Voled, where Voled is a turn-on voltage of 01; the change in the potential of N3 is VSS+Voled−Vinit2, and the potential of N1 is VSS+Voled−Vinit1+Vdata+Vth; a gate-source voltage of T0 is Vdata+Vth-Vinit1, and T0 operates in the saturation region.

In the light-emitting phase S4, the driving current I for T0 to drive O1 to emit light, equals $K(Vdata-Vinit1)^2$;

where K is the current coefficient of T0. It can be seen that the driving current I is not related to the threshold voltage of the driving transistor T0, VSS, and Voled, that is, at least one embodiment of the pixel circuit shown in FIG. 19 of the present disclosure can compensate for the uneven threshold voltage of the driving transistor T0, the voltage drop of the low voltage terminal ELVSS, and the uneven display caused by the aging of the organic light-emitting diode, thereby improving the display effect.

At least one embodiment of the pixel circuit shown in FIG. 19 of the present disclosure can use merely three sets of GOA, which can further achieve a narrow bezel.

In at least one embodiment of the pixel circuit shown in FIG. 19 of the present disclosure, the source electrode of T4 can be replaced with an electrically connection to the second node N2.

Figure 21:
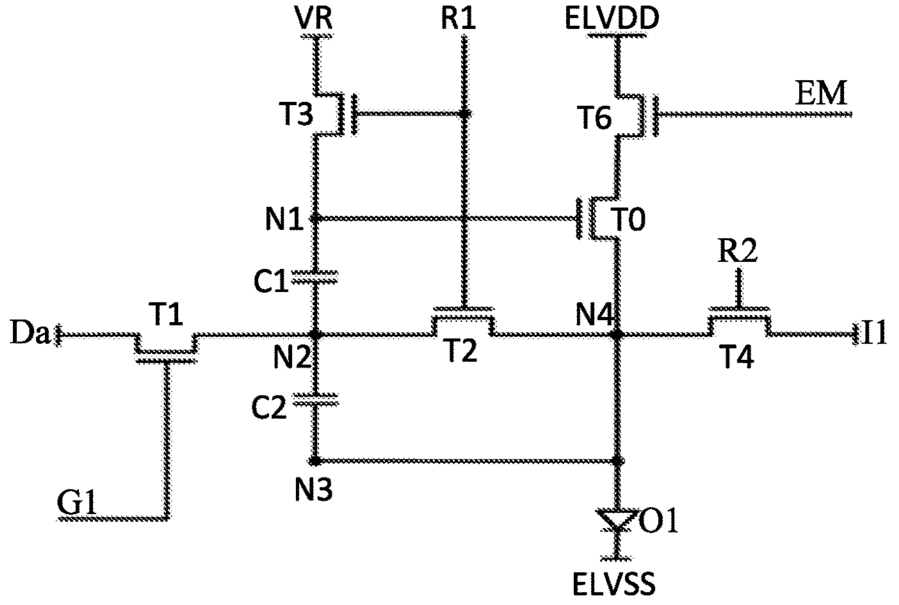
FIG. 21 is a circuit diagram of a pixel circuit according to at least one embodiment of the present disclosure.

A difference between at least one embodiment of the pixel circuit shown in FIG. 21 of the present disclosure and at least one embodiment of the pixel circuit shown in FIG. 19 of the present disclosure lies in that: a sixth transistor T6 is added.

A gate electrode of the sixth transistor T6 is electrically connected to the light-emitting control line EM; a drain electrode of the sixth transistor T6 is electrically connected to the power supply voltage terminal ELVDD; and a source electrode of the sixth transistor T6 is electrically connected to the source electrode of the driving transistor T0.

Figure 22:
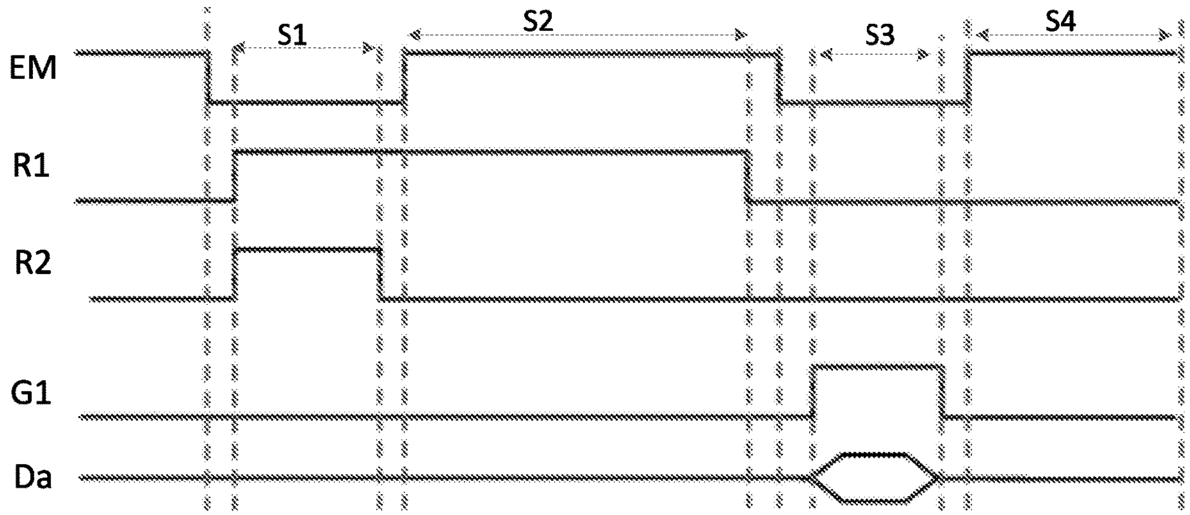
FIG. 22 is an operation sequence diagram of at least one embodiment of the pixel circuit shown in FIG. 21 of the present disclosure.

As shown in FIG. 22, when at least one embodiment of the pixel circuit shown in FIG. 21 of the present disclosure is in operation, a display period may include a reset phase S1, a compensation phase S2, a data writing phase S3, and a light-emitting phase S4, which are set in sequence.

In the reset phase S1, EM provides a low voltage signal, both R1 and R2 provide a high voltage signal, G1 provides a low voltage signal, and T2, T3 and T4 are all turned on; I1 writes the first initial voltage Vinit1 into N2, N3, and N4, and the reference voltage Vref provided by VR is written into N1.

In the compensation phase S2, R1 provides a high voltage signal, R2 provides a low voltage signal, G1 provides a low voltage signal, and T2 and T3 are turned on; EM provides a high voltage signal, and T6 is turned on.

At starting of the compensation phase S2, T0 is turned on, and the power supply voltage provided by ELVDD charges the capacitor through T6, T0 and T2 to change the potential of N4; until the potential of N4 becomes Vref-Vth, T0 is turned off, thereby completing the threshold voltage compensation for T0; Vref-VDD needs to be less than the threshold voltage Vth of T0.

In the data writing phase S3, EM provides a low voltage signal, R1 provides a low voltage signal, R2 provides a high voltage signal, G1 provides a high voltage signal, T4 is turned on, I1 provides the first initial voltage Vinit1 to N3, Da provides the data voltage Vdata, T2 is turned on, and the data line Da writes the data voltage Vdata into the second node N2; the first node N1 is in a floating state; the potential of N1 changes with the change in the potential of N2, with equal changes; Vdata is written into N2 through T1, and the potential of N2 changes from Vref-Vth to Vdata, with the change in the potential of N2 being Vdata-(Vref-Vth); at this point, the potential of N1 becomes Vref+Vdata-(Vref-Vth), that is, the potential of N1 becomes Vdata+Vth; T4 is turned on, the potential of N3 becomes Vinit1, and a difference between the potential of N1 and the potential of N3 is Vdata+Vth-Vinit1.

In the light-emitting phase S4, EM provides a high voltage signal, T6 is turned on, R1 and R2 provide a low voltage signal, and G1 provides a low voltage signal; T0, N1 and N2 are in a floating state, and the potentials of N1 and N2 change with the change in the potential of N3, with equal changes; T0 drives O1 to charge until O1 stably emits light; at this point, the potential of N3 is VSS+Voled, where Voled is the turn-on voltage of 01; the change in the potential of N3 is VSS+Voled−Vinit2, and the potential of N1 is VSS+Voled−Vinit1+Vdata+Vth; the gate-source voltage of T0 is Vdata+Vth-Vinit1, and T0 operates in the saturation region.

In the light-emitting phase S4, the driving current I for T0 to drive O1 to emit light, equals $K(Vdata-Vinit1)^2$;

where K is the current coefficient of T0. It can be seen that the driving current I is not related to the threshold voltage of the driving transistor T0, VSS, and Voled, that is, at least one embodiment of the pixel circuit shown in FIG. 21 of the present disclosure can compensate for the uneven threshold voltage of the driving transistor T0, the voltage drop of the low voltage terminal ELVSS, and the uneven display caused by the aging of the organic light-emitting diode, thereby improving the display effect.

At least one embodiment of the pixel circuit shown in FIG. 21 of the present disclosure can use merely four sets of GOA, which can further achieve a narrow bezel.

In at least one embodiment of the pixel circuit shown in FIG. 21 of the present disclosure, the sixth transistor T6 for light-emitting control is added, and T6 is turned off during the reset phase and the data writing phase to avoid generation of a current between ELVDD and I1 during the reset phase and the data writing phase, which would increase power consumption.

Figure 23:
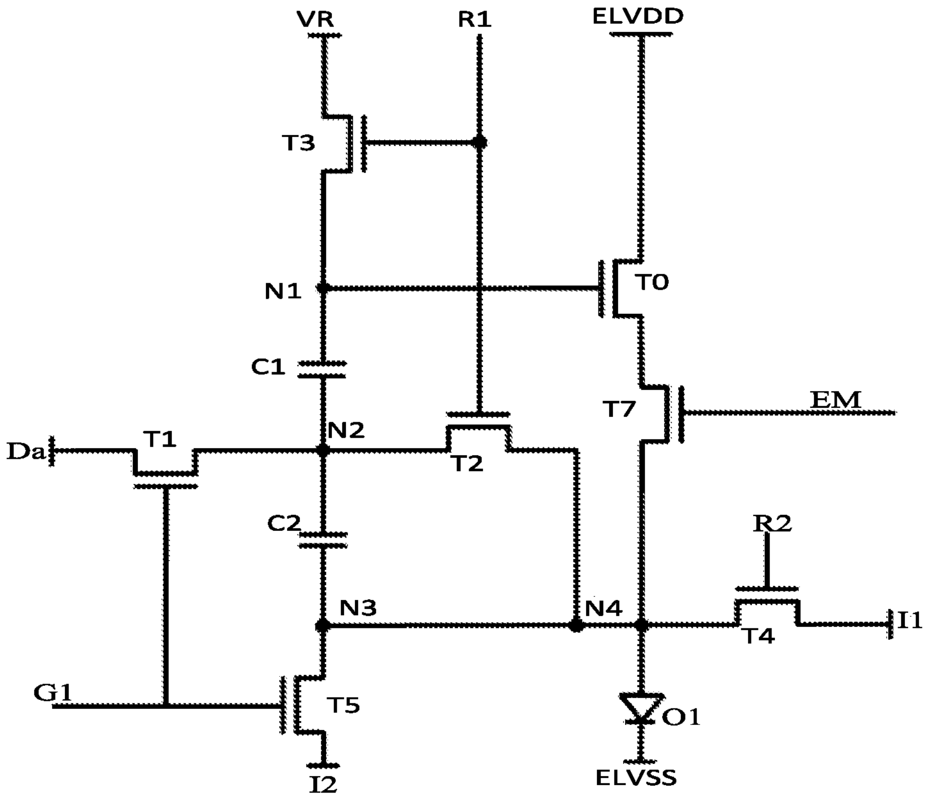
FIG. 23 is a circuit diagram of a pixel circuit according to at least one embodiment of the present disclosure.

A difference between at least one embodiment of the pixel circuit shown in FIG. 23 of the present disclosure and at least one embodiment of the pixel circuit shown in FIG. 13 of the present disclosure lies in that: the sixth transistor T6 is not provided and a seventh transistor T7 is further included.

The seventh transistor T7 is set between the drain electrode of the driving transistor T0 and the anode of the organic light-emitting diode O1.

The compensation node N4 is electrically connected to the third node N3, and the third node N3 is electrically connected to the anode of O1.

A gate electrode of T7 is electrically connected to the light-emitting control line EM.

A source electrode of T7 is electrically connected to the drain electrode of the driving transistor T0, and a drain electrode of T7 is electrically connected to the anode of O1.

Figure 24:
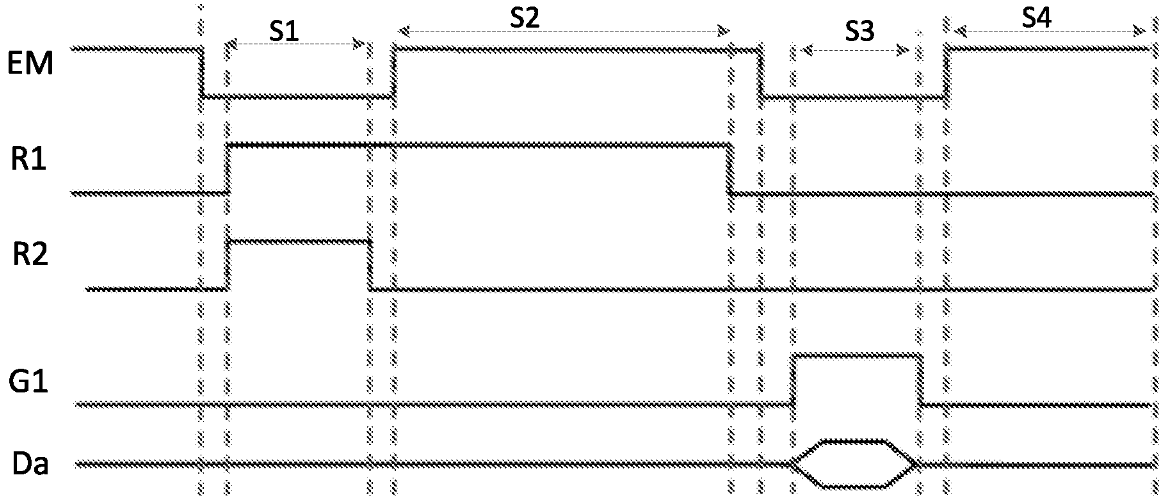
FIG. 24 is an operation sequence diagram of at least one embodiment of the pixel circuit shown in FIG. 23 of the present disclosure.

As shown in FIG. 24, when at least one embodiment of the pixel circuit shown in FIG. 23 of the present disclosure is in operation, a display period may include a reset phase S1, a compensation phase S2, a writing phase S3, and a light-emitting phase S4, which are set in sequence.

In the reset phase S1, EM provides a low voltage signal, R1 provides a high voltage signal, R2 provides a high voltage signal, G1 provides a low voltage signal, and T2 and T3 are turned on to write the reference voltage Vref provided by the reference voltage terminal VR into the first node N1, so that at starting of the compensation phase S2, the driving transistor T0 can be turned on; T4 is turned on, and the first initial voltage Vinit1 provided by I1 is written into N2 and N4, thereby resetting the potentials of N2 and N4; since there is no transistor between N3 and N4, the anode voltage of O1 and the potential of N3 can be reset at the same time.

In the compensation phase S2, EM provides a high voltage signal, R1 provides a high voltage signal, R2 provides a low voltage signal, G1 provides a low voltage signal, and T2, T3 and T7 are turned on.

At starting of the compensation phase S2, T0 is turned on, and the power supply voltage provided by ELVDD charges the capacitor through T7, T0 and T2 to change the potential of N4; until the potential of N4 becomes Vref-Vth, T0 is turned off, thereby completing the threshold voltage compensation for T0; Vref-VDD needs to be less than the threshold voltage Vth of T0.

In the writing phase S3, EM provides a low voltage signal, R1 and R2 provides a low voltage signal, G1 provides a high voltage signal, Da provides the data voltage Vdata, T5 and T1 are turned on, the data line Da writes the data voltage Vdata into the second node N2, and 12 writes the second initial voltage Vinit2 into the third node N3; the first node N1 is in a floating state; the potential of N1 changes with the change in the potential of N2, with equal changes; Vdata is written into N2 through T1, and the potential of N2 changes from Vref-Vth to Vdata, with the change in the potential of N2 being Vdata-(Vref-Vth); at this point, the potential of N1 becomes Vref+Vdata-(Vref-Vth), that is, the potential of N1 becomes Vdata+Vth; T5 is turned on, the potential of N3 becomes Vinit2, and the difference between the potential of N1 and the potential of N3 is Vdata+Vth-Vinit2.

In the light-emitting phase S4, EM provides a high voltage signal, R1 and R2 provide a low voltage signal, G1 provides a low voltage signal, and T0 and T7 are turned on, N1 and N2 are in a floating state, and the potentials of N1 and N2 change with the change in the potential of N3, with equal changes; T0 drives O1 to charge until O1 stably emits light; at this point, the potential of N3 is VSS+Voled, where Voled is the turn-on voltage of 01; the change in the potential of N3 is VSS+Voled−Vinit2, and the potential of N1 is VSS+Voled−Vinit2+Vdata+Vth; the gate-source voltage of T0 is Vdata+Vth-Vinit2, and T0 operates in the saturation region.

In the light-emitting phase S4, the driving current I for T0 to drive O1 to emit light, equals $K(Vdata\text{-}Vinit2)^2$;

where K is the current coefficient of T0. It can be seen that the driving current I is not related to the threshold voltage of the driving transistor T0, VSS, and Voled, that is, at least one embodiment of the pixel circuit shown in FIG. 23 of the present disclosure can compensate for the uneven threshold voltage of the driving transistor T0, the voltage drop of the low voltage terminal ELVSS, and the uneven display caused by the aging of the organic light-emitting diode, thereby improving the display effect.

In at least one embodiment of the present disclosure, VDD is the voltage value of the power supply voltage provided by ELVDD, and VSS is the voltage value of the low voltage signal provided by ELVSS.

Figure 25:
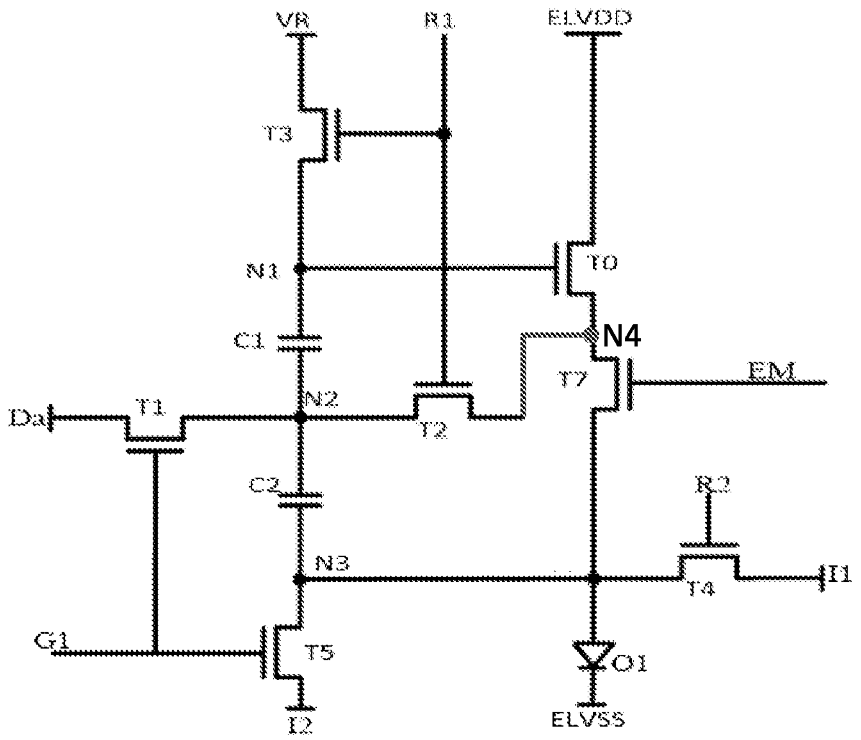
FIG. 25 is a circuit diagram of a pixel circuit according to at least one embodiment of the present disclosure.

A difference between at least one embodiment of the pixel circuit shown in FIG. 25 of the present disclosure and at least one embodiment of the pixel circuit shown in FIG. 23 of the present disclosure lies in that: the compensation node N4 is electrically connected to the drain electrode of T0.

Figure 26:
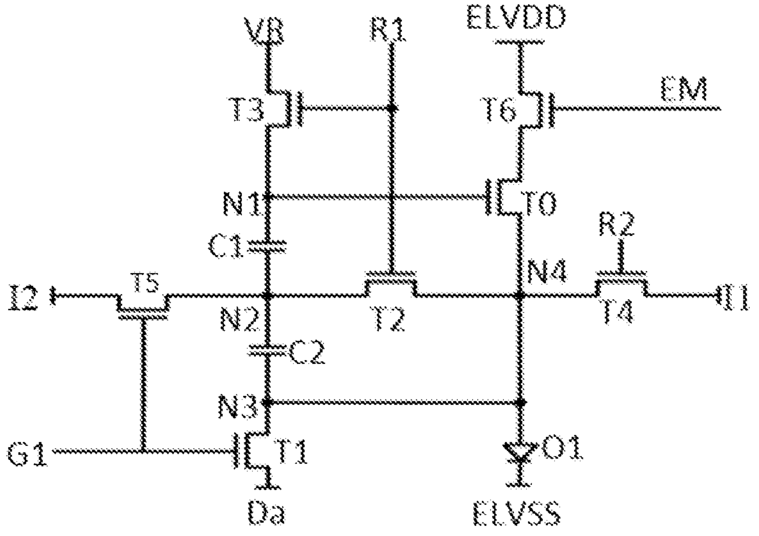
FIG. 26 is a circuit diagram of a pixel circuit according to at least one embodiment of the present disclosure.

A difference between at least one embodiment of the pixel circuit shown in FIG. 26 of the present disclosure and at least one embodiment of the pixel circuit shown in FIG. 13 of the present disclosure lies in that the data writing node is the third node N3, and the reset node is the second node N2.

In at least one embodiment of the pixel circuit shown in FIG. 26 of the present disclosure, a gate electrode of the first transistor T1 is electrically connected to the scanning line G1, a drain electrode of the first transistor T1 is electrically connected to the data line Da, and a source electrode of the first transistor T1 is electrically connected to the third node N3.

A gate electrode of the fifth transistor T5 is electrically connected to the scanning line G1, a drain electrode of the fifth transistor T5 is electrically connected to the second initial voltage terminal I2, and a source electrode of the fifth transistor T5 is electrically connected to the second node N2.

Figure 27:
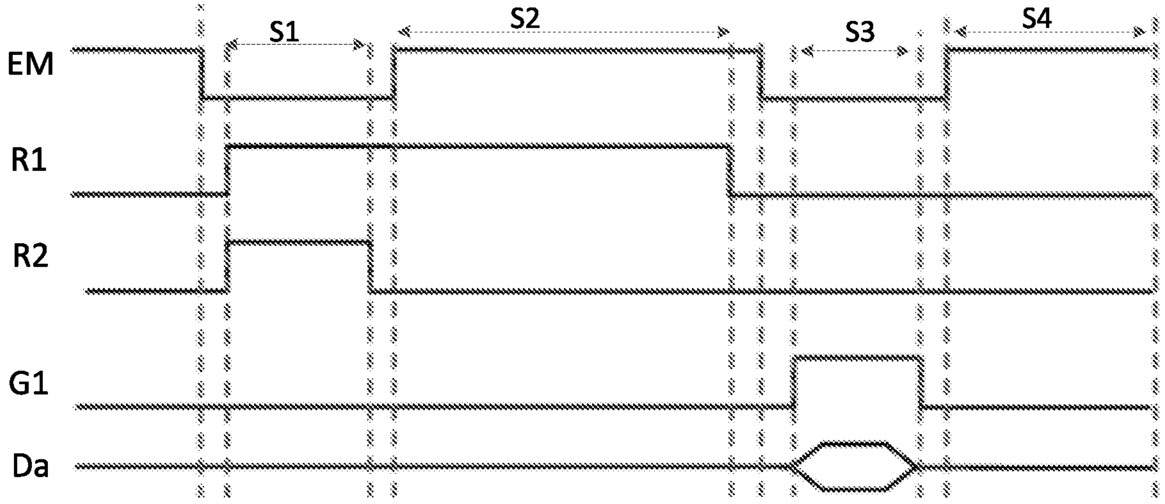
FIG. 27 is an operation sequence diagram of at least one embodiment of the pixel circuit shown in FIG. 26 of the present disclosure.

As shown in FIG. 27, when at least one embodiment of the pixel circuit shown in FIG. 26 of the present disclosure is in operation, a display period may include a reset phase S1, a compensation phase S2, a writing phase S3, and a light-emitting phase S4, which are set in sequence.

In the reset phase S1, EM provides a low voltage signal, R1 provides a high voltage signal, R2 provides a high voltage signal, G1 provides a low voltage signal, and T2 and T3 are turned on to write the reference voltage Vref provided by the reference voltage terminal VR into the first node N1, so that at starting of the compensation phase S2, the driving transistor T0 can be turned on; T4 is turned on, and the first initial voltage Vinit1 provided by I1 is written into N2 and N4, thereby resetting the potentials of N2 and N4; since there is no transistor between N3 and N4, the anode voltage of O1 and the potential of N3 can be reset at the same time.

In the compensation phase S2, EM provides a high voltage signal, R1 provides a high voltage signal, R2 provides a low voltage signal, G1 provides a low voltage signal, and T2, T3 and T6 are turned on.

At starting of the compensation phase S2, T0 is turned on, and the power supply voltage provided by ELVDD charges the capacitor through T6, T0 and T2 to change the potential of N4; until the potential of N4 becomes Vref-Vth, T0 is turned off, thereby completing the threshold voltage compensation for T0; Vref-VDD needs to be less than the threshold voltage Vth of T0 to enable turning off T0.

In the writing phase S3, EM provides a low voltage signal, R1 and R2 provide a low voltage signal, G1 provides a high voltage signal, Da provides a data voltage Vdata, T5 and T1 are turned on, the data line Da writes the data voltage Vdata into the third node N3, and I2 writes the second initial voltage Vinit2 into the second node N2; the first node N1 is in a floating state, and the potential of N1 changes with the change in the potential of N2, with equal changes; Vinit2 is written into N2 through T5, and the potential of N2 changes from Vref-Vth to Vinit2, with the change in the potential of N2 being Vinit2-(Vref-Vth); at this point, the potential of N1 becomes Vref+Vinit2-(Vref-Vth), that is, the potential of N1 becomes Vinit2+Vth; T2 is turned on, the potential of N3 becomes Vdata, and the difference between the potential of N1 and the potential of N3 is Vinit2+Vth-Vdata.

In the light-emitting phase S4, EM provides a high voltage signal, R1 and R2 provide a low voltage signal, G1 provides a low voltage signal, and T0 and T6 are turned on; N1 and N2 are in a floating state, and the potentials of N1 and N2 change with the change in the potential of N3, with equal changes; T0 drives O1 to charge until O1 stably emits light; at this point, the potential of N3 is VSS+Voled, where Voled is the turn-on voltage of 01; the change in the potential of N3 is VSS+Voled-Vdata.

The potential of N1 is VSS+Voled-Vdata+Vinit2+Vth; the gate-source voltage of T0 is Vdata+Vth-Vinit2, and T0 operates in the saturation region.

In the light-emitting phase S4, the driving current I for T0 to drive O1 to emit light, equals $K(Vinit2-Vdata)^2$;

where K is the current coefficient of T0. It can be seen that the driving current I is not related to the threshold voltage of the driving transistor T0, VSS, and Voled, that is, at least one embodiment of the pixel circuit shown in FIG. 26 of the present disclosure can compensate for the uneven threshold voltage of the driving transistor T0, the voltage drop of the low voltage terminal ELVSS, and the uneven display caused by the aging of the organic light-emitting diode, thereby improving the display effect.

In at least one embodiment of the pixel circuit shown in FIG. 26 of the present disclosure, the sixth transistor T6 may not be set up.

In at least one embodiment of the pixel circuit shown in FIG. 26 of the present disclosure, the sixth transistor T6 may not be set up, and a seventh transistor T7 can be disposed between the drain electrode of T0 and the anode of O1; at this point, the compensation node N4 can be electrically connected to the anode of O1 or the drain electrode of T0.

A pixel driving method according to at least one embodiment of the present disclosure is applied to the foregoing pixel circuit. One display period includes a compensation phase, a writing phase, and a light-emitting phase, which are set in sequence. The pixel driving method includes:

in the compensation phase, controlling, by the compensation control circuit under control of a first reset signal, a second node to be connected with a compensation node;

at starting of the compensation phase, controlling, by the driving circuit under control of a potential at a control terminal of the driving circuit, a first terminal of the driving circuit to be connected with a second terminal of the driving circuit to charge the first energy storage circuit and the second energy storage circuit through the power supply voltage terminal, until the driving circuit, under control of the potential at the control terminal of the driving circuit, controls the first terminal of the driving circuit to be disconnected from the second terminal of the driving circuit;

in the writing phase, writing, by the data writing circuit under control of a scanning signal, a data voltage on the data line into the data writing node, and controlling, by the compensation control circuit under control of the first reset signal, the second node to be disconnected from the compensation node;

in the light-emitting phase, driving, by the driving circuit, the light-emitting element.

In the pixel driving method according to at least one embodiment of the present disclosure, threshold voltage compensation is performed during the compensation phase, data voltage writing is performed during the writing phase, and threshold voltage compensation and data voltage writing are performed in a time-division manner, thereby achieving high-frequency driving while sufficiently compensating the threshold voltage.

In at least one embodiment of the present disclosure, the display period further includes a reset phase set before the compensation phase. The pixel driving method further includes:

in the reset phase and the compensation phase, writing, by the first reset circuit under control of the first reset signal, a reference voltage into the first node;

in the reset phase, writing, by the second reset circuit under control of a second reset signal, a first initial voltage into the reset node.

The pixel driving method according at least one embodiment of the present disclosure further includes:

in the reset phase, controlling, by the compensation control circuit under control of the first reset signal, the second node to be connected with the compensation node.

Optionally, the pixel driving method according at least one embodiment of the present disclosure may further include:

in the writing phase, writing, by the second reset circuit under control of the second reset signal, the first initial voltage into the reset node.

In at least one embodiment of the present disclosure, the pixel circuit further includes a third reset circuit. The pixel driving method further includes:

in the writing phase, writing, by the third reset circuit under control of the scanning signal, a second initial voltage into the reset node.

In at least one embodiment of the present disclosure, the pixel circuit further includes a first light-emitting control circuit. The pixel driving method further includes:

in the compensation phase and the light-emitting phase, controlling, by the first light control circuit under control of a light-emitting control signal, the power supply voltage terminal to be connected with the first terminal of the driving circuit.

Optionally, the pixel circuit further includes a second light-emitting control circuit. The pixel driving method further includes:

in the compensation phase and the light-emitting phase, controlling, by the second light control circuit under control of the light control signal, the second terminal of the driving circuit to be connected with the first electrode of the light-emitting element.

A display device according to one embodiment of the present disclosure includes the foregoing pixel circuit.

The foregoing embodiments are preferred embodiments of the present disclosure. It should be noted that a person skilled in the art may make further modifications and improvements without departing from the spirit of the present disclosure, and these modifications and improvements shall also fall within the scope of the present disclosure.

What is claimed is:

1. A pixel circuit, comprising: a light-emitting element, a driving circuit, a first energy storage circuit, a second energy storage circuit, a data writing circuit, and a compensation control circuit;

wherein a first terminal of the first energy storage circuit is electrically connected to a first node, and a second terminal of the first energy storage circuit is electrically connected to a second node; the first energy storage circuit is configured to store electrical energy;

a first terminal of the second energy storage circuit is electrically connected to the second node, and a second terminal of the second energy storage circuit is electrically connected to a third node; the second energy storage circuit is configured to store electrical energy;

a control terminal of the driving circuit is electrically connected to the first node; the driving circuit is configured to, under control of a potential at the control terminal of the driving circuit, drive the light-emitting element;

the third node is electrically connected to a first electrode of the light-emitting element, and a second electrode of the light-emitting element is electrically connected to a first voltage terminal;

the data writing circuit is electrically connected to a scanning line, a data line, and a data writing node, respectively; the data writing circuit is configured to, under control of a scanning signal provided by the scanning line, control writing of a data voltage on the data line into the data writing node;

the compensation control circuit is electrically connected to a first reset terminal, the second node and a compensation node, respectively; the compensation control circuit is configured to, under control of a first reset signal, control whether the second node is connected with or disconnected from the compensation node;

the compensation node is electrically connected to the third node, and, the compensation node is electrically connected to a second terminal of the driving circuit; the data writing node is the second node or the third node.

2. The pixel circuit according to claim 1, further comprising a first reset circuit and a second reset circuit;

wherein the first reset circuit is electrically connected to the first reset terminal, a reference voltage terminal and the first node, respectively; the first reset circuit is configured to, under control of the first reset signal provided by the first reset terminal, write a reference voltage provided by the reference voltage terminal into the first node;

the second reset circuit is electrically connected to a second reset terminal, a first initial voltage terminal and a reset node, respectively; the second reset circuit is configured to, under control of a second reset signal provided by the second reset terminal, write a first initial voltage provided by the first initial voltage terminal into the reset node;

the reset node is the second node or the third node.

3. The pixel circuit according to claim 2, further comprising a third reset circuit;

wherein the third reset circuit is electrically connected to the scanning line, a second initial voltage terminal and the reset node, respectively; the third reset circuit is configured to, under control of the scanning signal provided by the scanning line, write a second initial voltage provided by the second initial voltage terminal into the reset node;

the data writing node is the second node, and the reset node is the third node; or, the data writing node is the third node, and the reset node is the second node.

4. The pixel circuit according to claim 2, further comprising a first light-emitting control circuit;

wherein a first terminal of the driving circuit is electrically connected to a power supply voltage terminal through the first light-emitting control circuit; the second terminal of the driving circuit is electrically connected to the first electrode of the light-emitting element;

a control terminal of the first light-emitting control circuit is electrically connected to a light-emitting control line; the first light-emitting control circuit is configured to, under control of a light-emitting control signal provided by the light-emitting control line, control whether the power supply voltage terminal is connected with or disconnected from the first terminal of the driving circuit.

5. The pixel circuit according to claim 2, further comprising a second light-emitting control circuit;

wherein a first terminal of the driving circuit is electrically connected to a power supply voltage terminal, and the second terminal of the driving circuit is electrically connected to the first electrode of the light-emitting element through the second light-emitting control circuit;

a control terminal of the second light-emitting control circuit is electrically connected to a light-emitting control line; the second light-emitting control circuit is configured to, under control of a light-emitting control signal provided by the light-emitting control line, control whether the second terminal of the driving circuit is connected with or disconnected from the first electrode of the light-emitting element.

6. The pixel circuit according to claim 1, wherein the data writing circuit comprises a first transistor, and the compensation control circuit comprises a second transistor;

a gate electrode of the first transistor is electrically connected to the scanning line, a first electrode of the first transistor is electrically connected to the data line, and a second electrode of the first transistor is electrically connected to the data writing node;

a gate electrode of the second transistor is electrically connected to the first reset terminal, a first electrode of the second transistor is electrically connected to the second node, and a second electrode of the second transistor is electrically connected to the compensation node.

7. The pixel circuit according to claim 2, wherein the driving circuit comprises a driving transistor, the first reset circuit comprises a third transistor, and the second reset circuit comprises a fourth transistor;

a gate electrode of the driving transistor is electrically connected to the first node, a first electrode of the driving transistor is electrically connected to the first terminal of the driving circuit, and a second electrode of the driving transistor is electrically connected to the second terminal of the driving circuit;

a gate electrode of the third transistor is electrically connected to the first reset terminal, a first electrode of the third transistor is electrically connected to the reference voltage terminal, and a second electrode of the third transistor is electrically connected to the first node;

a gate electrode of the fourth transistor is electrically connected to the second reset terminal, a first electrode of the fourth transistor is electrically connected to the first initial voltage terminal, and a second electrode of the fourth transistor is electrically connected to the reset node.

8. The pixel circuit according to claim 1, wherein the first energy storage circuit comprises a first capacitor, and the second energy storage circuit comprises a second capacitor;

a first terminal of the first capacitor is electrically connected to the first node, and a second terminal of the first capacitor is electrically connected to the second node;

a first terminal of the second capacitor is electrically connected to the second node, and a second terminal of the second capacitor is electrically connected to the third node.

9. The pixel circuit according to claim 3, wherein the third reset circuit comprises a fifth transistor;

a gate electrode of the fifth transistor is electrically connected to the scanning line, a first electrode of the fifth transistor is electrically connected to the second initial voltage terminal, and a second electrode of the fifth transistor is electrically connected to the reset node.

10. The pixel circuit according to claim 4, wherein the first light-emitting control circuit comprises a sixth transistor;

a gate electrode of the sixth transistor is electrically connected to the light-emitting control line, a first electrode of the sixth transistor is electrically connected to the power supply voltage terminal, and a second electrode of the sixth transistor is electrically connected to the first terminal of the driving circuit.

11. The pixel circuit according to claim 5, wherein the second light-emitting control circuit comprises a seventh transistor;

a gate electrode of the seventh transistor is electrically connected to the light-emitting control line, a first electrode of the seventh transistor is electrically connected to the second terminal of the driving circuit, and a second electrode of the seventh transistor is electrically connected to the first electrode of the light-emitting element.

12. A pixel driving method applied to the pixel circuit according to claim 1, comprising: for a display period including a compensation phase, a writing phase and a light-emitting phase which are set in sequence, in the compensation phase, controlling, by the compensation control circuit under control of a first reset signal, the second node to be connected with the compensation node;

at starting of the compensation phase, controlling, by the driving circuit under control of a potential at the control terminal of the driving circuit, the first terminal of the driving circuit to be connected with the second terminal of the driving circuit to charge the first energy storage circuit and the second energy storage circuit through the power supply voltage terminal, until the driving circuit, under control of the potential at the control terminal of the driving circuit, controls the first terminal of the driving circuit to be disconnected from the second terminal of the driving circuit;

in the writing phase, writing, by the data writing circuit under control of a scanning signal, a data voltage on the data line into the data writing node, and controlling, by the compensation control circuit under control of the first reset signal, the second node to be disconnected from the compensation node;

in the light-emitting phase, driving, by the driving circuit, the light-emitting element.

13. The pixel driving method according to claim 12, wherein the display period further comprises a reset phase set before the compensation phase; the pixel driving method further comprises:

in the reset phase and the compensation phase, writing, by the first reset circuit under control of the first reset signal, a reference voltage into the first node;

in the reset phase, writing, by the second reset circuit under control of a second reset signal, a first initial voltage into the reset node.

14. The pixel driving method according to claim 13, further comprising:

in the reset phase, controlling, by the compensation control circuit under control of the first reset signal, the second node to be connected with the compensation node.

15. The pixel driving method according to claim 13, wherein the pixel driving method comprises:

in the writing phase, writing, by the second reset circuit under control of the second reset signal, the first initial voltage into the reset node.

16. The pixel driving method according to claim 13, wherein the pixel circuit further comprises a third reset circuit; the pixel driving method further comprises:

in the writing phase, writing, by the third reset circuit under control of the scanning signal, a second initial voltage into the reset node.

17. The pixel driving method according to claim 13, wherein the pixel circuit further comprises a first light-emitting control circuit; the pixel driving method further comprises:

in the compensation phase and the light-emitting phase, controlling, by the first light control circuit under control of a light-emitting control signal, the power supply voltage terminal to be connected with the first terminal of the driving circuit.

18. The pixel driving method according to claim 13, wherein the pixel circuit further comprises a second light-emitting control circuit; the pixel driving method further comprises:

in the compensation phase and the light-emitting phase, controlling, by the second light control circuit under control of the light control signal, the second terminal of the driving circuit to be connected with the first electrode of the light-emitting element.

19. A display device, comprising: a pixel circuit;

wherein the pixel circuit comprises: a light-emitting element, a driving circuit, a first energy storage circuit, a second energy storage circuit, a data writing circuit, and a compensation control circuit;

wherein a first terminal of the first energy storage circuit is electrically connected to a first node, and a second terminal of the first energy storage circuit is electrically connected to a second node; the first energy storage circuit is configured to store electrical energy;

a first terminal of the second energy storage circuit is electrically connected to the second node, and a second terminal of the second energy storage circuit is electrically connected to a third node; the second energy storage circuit is configured to store electrical energy;

a control terminal of the driving circuit is electrically connected to the first node; the driving circuit is configured to, under control of a potential at the control terminal of the driving circuit, drive the light-emitting element;

the third node is electrically connected to a first electrode of the light-emitting element, and a second electrode of the light-emitting element is electrically connected to a first voltage terminal;

the data writing circuit is electrically connected to a scanning line, a data line, and a data writing node, respectively; the data writing circuit is configured to, under control of a scanning signal provided by the scanning line, control writing of a data voltage on the data line into the data writing node;

the compensation control circuit is electrically connected to a first reset terminal, the second node and a compensation node, respectively; the compensation control circuit is configured to, under control of a first reset signal, control whether the second node is connected with or disconnected from the compensation node;

the compensation node is electrically connected to the third node, and, the compensation node is electrically connected to a second terminal of the driving circuit; the data writing node is the second node or the third node.

20. The display device according to claim 19, wherein the pixel circuit further comprises a first reset circuit and a second reset circuit;

wherein the first reset circuit is electrically connected to the first reset terminal, a reference voltage terminal and the first node, respectively; the first reset circuit is configured to, under control of the first reset signal provided by the first reset terminal, write a reference voltage provided by the reference voltage terminal into the first node;

the second reset circuit is electrically connected to a second reset terminal, a first initial voltage terminal and a reset node, respectively; the second reset circuit is configured to, under control of a second reset signal provided by the second reset terminal, write a first initial voltage provided by the first initial voltage terminal into the reset node;

the reset node is the second node or the third node.

* * * * *